US012322880B2

(12) United States Patent
Wang et al.

(10) Patent No.: US 12,322,880 B2
(45) Date of Patent: Jun. 3, 2025

(54) ANTENNA STRUCTURE AND ELECTRONIC DEVICE

(71) Applicants: Beijing BOE Technology Development Co., Ltd., Beijing (CN); BOE Technology Group Co., Ltd., Beijing (CN)

(72) Inventors: Yali Wang, Beijing (CN); Dongdong Zhang, Beijing (CN); Yafei Zhang, Beijing (CN); Hai Yu, Beijing (CN); Guoqiang Tang, Beijing (CN); Mengwen Jia, Beijing (CN); Feng Qu, Beijing (CN); Biqi Li, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 124 days.

(21) Appl. No.: 17/787,342

(22) PCT Filed: Aug. 26, 2021

(86) PCT No.: PCT/CN2021/114782
§ 371 (c)(1),
(2) Date: Jun. 20, 2022

(87) PCT Pub. No.: WO2023/024023
PCT Pub. Date: Mar. 2, 2023

(65) Prior Publication Data

US 2024/0186705 A1 Jun. 6, 2024

(51) Int. Cl.
*H01Q 1/48* (2006.01)
*H01Q 1/24* (2006.01)
*H01Q 9/04* (2006.01)

(52) U.S. Cl.
CPC ............. *H01Q 9/045* (2013.01); *H01Q 1/243* (2013.01)

(58) Field of Classification Search
CPC ................................ H01Q 9/045; H01Q 1/243
See application file for complete search history.

(56) References Cited

U.S. PATENT DOCUMENTS 6,198,437 B1 * 3/2001 Watson ................ H01Q 21/064 343/846
6,937,193 B2 * 8/2005 Hendler ................... H01Q 1/38 343/846

(Continued)

FOREIGN PATENT DOCUMENTS

CN 105720364 A 6/2016
CN 207517871 U 6/2018

(Continued)

OTHER PUBLICATIONS

Li, Yapeng & Zhao, Zhipeng & Tang, Zhaoyang & Yin, Y.-Z. (2019). Differentially fed, dual-band filtering antenna with H-shaped slot. Microwave and Optical Technology Letters. 62. 10.1002/mop.32034.*

(Continued)

*Primary Examiner* — Dimary S Lopez Cruz
*Assistant Examiner* — Bamidele A Immanuel
(74) *Attorney, Agent, or Firm* — Ling Wu; Stephen Yang; Ling and Yang Intellectual Property

(57) ABSTRACT

An antenna structure includes a substrate, a ground layer, a radiation patch, a first feed structure, and a second feed structure. The radiation patch, the first feed structure, and the second feed structure are located on a first surface of the substrate, and the ground layer is located on a second surface of the substrate. The first surface and the second surface are two surfaces of the substrate facing away from each other. The radiation patch has a slotted structure. In a first direc- (Continued)

tion, the first feed structure and the second feed structure are symmetrically located on both sides of the radiation patch.

18 Claims, 18 Drawing Sheets

(56) References Cited

U.S. PATENT DOCUMENTS

| | | | | |
|---|---|---|---|---|
| 8,125,390 | B2 * | 2/2012 | Kuramoto | H01Q 9/065 343/702 |
| 2004/0196187 | A1 * | 10/2004 | Yeh | H01Q 9/0407 343/846 |
| 2005/0030230 | A1 * | 2/2005 | Otaka | H01Q 1/38 343/700 MS |
| 2008/0238800 | A1 * | 10/2008 | Collins | H01Q 9/26 343/795 |
| 2012/0162021 | A1 | 6/2012 | Lee et al. | |
| 2017/0294717 | A1 | 10/2017 | Zhang et al. | |
| 2020/0058998 | A1 * | 2/2020 | Kirknes | H01Q 9/0457 |
| 2020/0196439 | A1 * | 6/2020 | Hamabe | H05K 1/0253 |
| 2020/0350672 | A1 * | 11/2020 | Chen | H01Q 5/10 |
| 2022/0131268 | A1 * | 4/2022 | Lo | H01Q 9/42 |

FOREIGN PATENT DOCUMENTS

| | | | | |
|---|---|---|---|---|
| CN | 109524762 | A | 3/2019 | |
| CN | 109904613 | A | 6/2019 | |
| CN | 108258405 | B * | 7/2020 | H01P 7/082 |
| CN | 112382854 | A | 2/2021 | |
| CN | 112736423 | A * | 4/2021 | H01Q 1/36 |
| EP | 1933419 | A1 | 6/2008 | |

OTHER PUBLICATIONS

Zhao, Fang-Li & Weng, Min-Hang & Tsai, Chin-Yi & Yang, Ru-Yuan & Lai, Hong-Zheng & Liu, Shih-Kun. (2019). A miniaturized high selectivity band-pass filter using a dual-mode patch resonator with two pairs of slots. Microwave and Optical Technology Letters. 62. 10.1002/mop.32165.*

Yapeng Li et al., "Differentially fed, dual-band filtering antenna with H-shaped slot", Microw Opt Technol Lett. 2019;1-5.

Jianfang Deng et al., "Dual-Band Microstrip Filtering Antennas with Symmetrical Slots", Progress In Electromagnetics Research Letters, vol. 86, 13-19, 2019.

* cited by examiner

ANTENNA STRUCTURE AND ELECTRONIC DEVICE

CROSS-REFERENCE TO RELATED APPLICATION

This application is a national stage application of PCT Application No. PCT/CN2021/114782, which is filed on Aug. 26, 2021 and entitled "Antenna Structure and Electronic Device", the content of which is incorporated herein by reference in its entirety.

TECHNICAL FIELD

The present disclosure relates, but is not limited to, the field of communication technologies, and in particular to an antenna structure and an electronic device.

BACKGROUND

As an important constituent part of mobile communication, research and design of an antenna play a vital role in mobile communication. However, a biggest change brought by the fifth generation (5G) mobile communication technology is innovation of user experience, and quality of signals in a terminal device directly affects the user experience, therefore a design of an antenna of a 5G terminal will become an important link of 5G deployment.

SUMMARY

The following is a summary of subject matters described herein in detail. The summary is not intended to limit the protection scope of claims.

Embodiments of the present disclosure provide an antenna structure and an electronic device.

In one aspect, an embodiment of the present disclosure provides an antenna structure including a substrate, a ground layer, a radiation patch, a first feed structure, and a second feed structure. The radiation patch, the first feed structure, and the second feed structure are located on a first surface of the substrate, and the ground layer is located on a second surface of the substrate; and the first surface and the second surface are two surfaces of the substrate facing away from each other. The radiation patch has a slotted structure. In a first direction, the first feed structure and the second feed structure are symmetrically located on both sides of the radiation patch.

In some exemplary implementation modes, the radiation patch is configured to introduce two resonant frequency points and one radiation zero point between the two resonant frequency points, and the first feed structure and the second feed structure are configured to introduce another two radiation zero points.

In some exemplary implementation modes, the slotted structure is substantially symmetrical about a first centerline of the radiation patch in the first direction and is substantially symmetrical about a second centerline of the radiation patch in a second direction; and the second direction intersects the first direction.

In some exemplary implementation modes, an orthographic projection of the slotted structure on the substrate is substantially H-shaped.

In some exemplary implementation modes, the slotted structure has a first slot, a second slot, and a third slot; the first slot and the third slot are connected on both sides of the second slot symmetrically about the second centerline, and the second slot communicates with the first slot and the third slot.

In some exemplary implementation modes, a width of the second slot is less than a width of the first slot.

In some exemplary implementation modes, orthographic projections of the first slot and the third slot on the substrate are straight line segments parallel to the second direction.

In some exemplary implementation modes, the first slot has a first portion and a second portion in communication; orthographic projections of the first portion and the second portion on the substrate are both L-shaped, and the first portion and the second portion are substantially symmetrical about the first centerline.

In some exemplary implementation modes, the first slot has a third portion, a fourth portion, and a fifth portion in communication; the third portion and the fifth portion are symmetrically connected on both sides of the fourth portion in the first direction; the fourth portion communicates with the second slot, and a width of the fourth portion gradually decreases along a direction away from a position of communication with the second slot until substantially the same as a width of the third portion.

In some exemplary implementation modes, an orthographic projection of the second slot on the substrate is a straight line segment parallel to the first direction.

In some exemplary implementation modes, the second slot includes a first slit extending along the second direction and n second slits extending along the first direction; the n second slits are arranged sequentially along the second direction, and the first slit communicates with the n second slits, wherein, n is greater than 0 and less than or equal to 3.

In some exemplary implementation modes, any second slit is substantially symmetrical about the first centerline and n second slits are substantially symmetrical about the second centerline.

In some exemplary implementation modes, the radiation patch has a first edge and a second edge in the first direction in a plane parallel to the substrate; the first feed structure is adjacent to the first edge, and the second feed structure is adjacent to the second edge. A pitch between the first feed structure and the first edge of the radiation patch is less than or equal to a pitch between the second feed structure and the second edge of the radiation patch.

In some exemplary implementation modes, the radiation patch has a first notch at the first edge and a second notch at the second edge in a plane parallel to the substrate; at least a portion of the first feed structure is located within the first notch, and at least a portion of the second feed structure is located within the second notch.

In some exemplary implementation modes, the first feed structure includes: a feed main body, a first branch, and a second branch; the first branch and the second branch are electrically connected on both sides of the feed main body symmetrically about a centerline of the first feed structure in a second direction.

In some exemplary implementation modes, the feed main body of the first feed structure includes: a first feed main body and a second feed main body electrically connected in sequence; the first branch and the second branch are electrically connected on both sides of the first feed main body symmetrically about the centerline of the first feed structure in the second direction; a width of the first feed main body is greater than a width of the second feed main body, and at least a portion of the second feed main body is located within the first notch of the radiation patch.

In some exemplary implementation modes, the first branch of the first feed structure includes: a first feed branch and a first open-circuit branch, wherein the first feed branch is electrically connected with the first feed main body and the first open-circuit branch, and the first open-circuit branch is located on one side of the first feed branch away from the first feed main body. The second branch of the first feed structure includes: a second feed branch and a second open-circuit branch, the second feed branch is electrically connected with the first feed main body and the second open-circuit branch, and the second open-circuit branch is located on one side of the second feed branch away from the first feed main body.

In some exemplary implementation modes, the first open-circuit branch and the second open-circuit branch of the first feed structure are straight line segments parallel to the first direction.

In some exemplary implementation modes, orthographic projections of the radiation patch, the first feed structure, and the second feed structure on the substrate are not overlapped.

In another aspect, an embodiment of the present disclosure provides an electronic device, including the antenna structure as described above.

After reading and understanding the drawings and the detailed description, other aspects may be understood.

BRIEF DESCRIPTION OF DRAWINGS

Accompanying drawings are used for providing further understanding of technical solutions of the present disclosure, constitute a part of the specification, and together with the embodiments of the present disclosure, are used for explaining the technical solutions of the present disclosure but not to constitute limitations on the technical solutions of the present disclosure. Shapes and sizes of one or more components in the drawings do not reflect true scales, and are only intended to schematically describe contents of the present disclosure.

DETAILED DESCRIPTION

Figure 1:
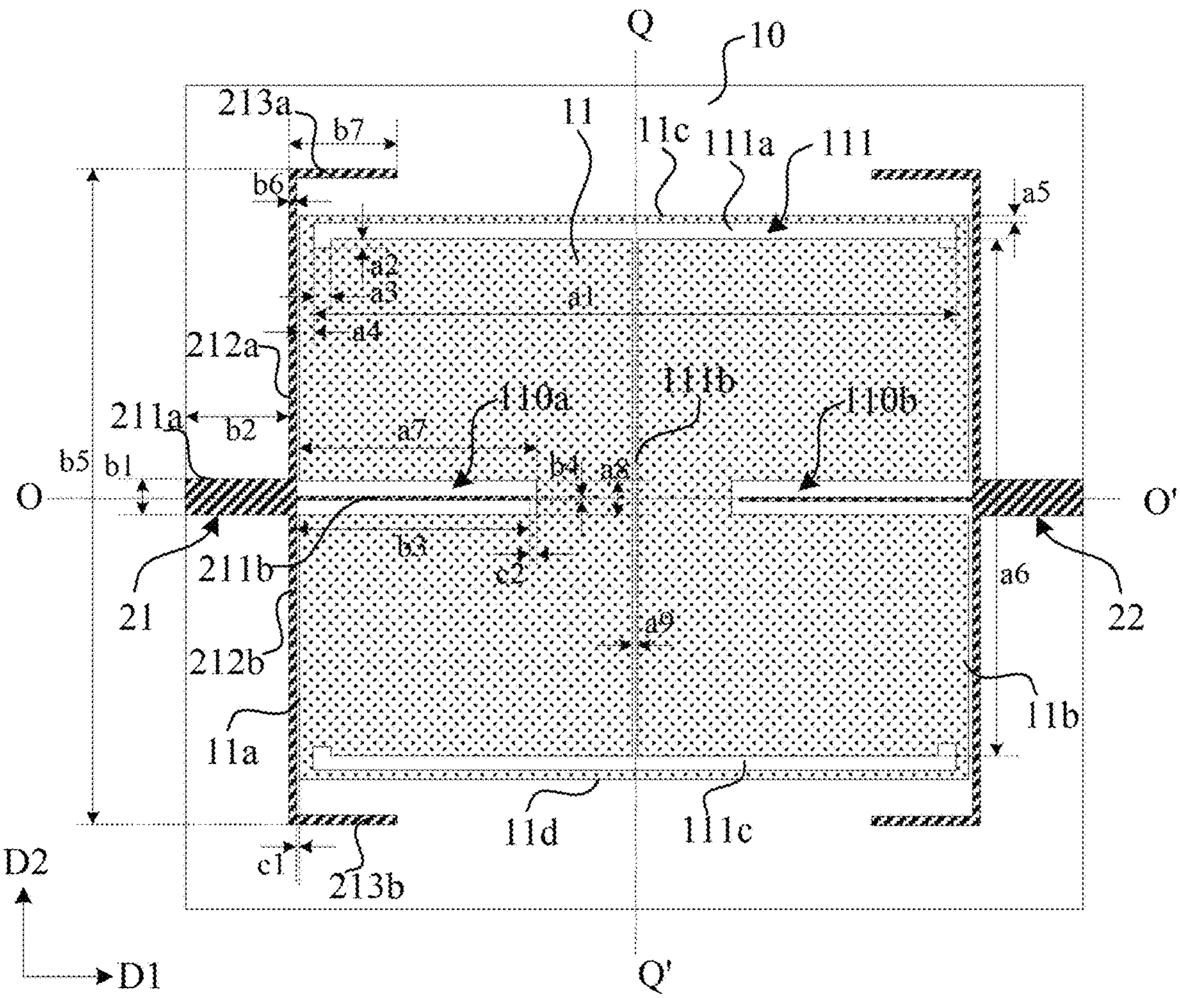
FIG. 1 is a schematic plan view of an antenna structure according to at least one embodiment of the present disclosure.

The embodiments of the present disclosure will be described below in combination with the drawings in detail. Implementation modes may be implemented in multiple different forms. Those of ordinary skills in the art may easily understand such a fact that implementation modes and contents may be transformed into one or more forms without departing from the purpose and scope of the present disclosure. Therefore, the present disclosure should not be explained as being limited to contents described in following implementation modes only. The embodiments in the present disclosure and features in the embodiments may be combined randomly with each other if there is no conflict.

In the drawings, a size of one or more constituent elements, a thickness of a layer, or a region is sometimes exaggerated for clarity. Therefore, one implementation mode of the present disclosure is not necessarily limited to the sizes, and the shapes and sizes of multiple components in the accompanying drawings do not reflect actual scales. In addition, the drawings schematically illustrate ideal examples, and one embodiment of the present disclosure is not limited to the shapes, numerical values, or the like shown in the drawings.

Ordinal numerals such as "first", "second" and "third" in the present disclosure are set to avoid confusion of constituents, but not intended for restriction in quantity. "A plurality of/multiple" in the present disclosure means a quantity of two or more.

In the present disclosure, sometimes for convenience, wordings "central", "up", "down", "front", "back", "vertical", "horizontal", "top", "bottom", "inside", "outside" and the like indicating directional or positional relationships are used to illustrate positional relationships between constituent elements with reference to the drawings. These terms are not intended to indicate or imply that involved devices or elements must have specific orientations and be structured and operated in the specific orientations but only to facilitate describing the present specification and simplify the description, and thus should not be understood as limitations on the present disclosure. The positional relationships between the constituent elements may be changed as appropriate based on the directions according to which the constituent elements are described. Therefore, appropriate replacements may be made according to situations without being limited to the wordings described in the specification.

In the present disclosure, unless otherwise specified and defined, terms “mounting”, “mutual connection” and “connection” should be understood in a broad sense. For example, a connection may be a fixed connection, or a detachable connection, or an integrated connection. It may be a mechanical connection or an electrical connection. It may be a direct mutual connection, or an indirect connection through middleware, or internal communication between two components. Those of ordinary skills in the art may understand meanings of the above-mentioned terms in the present disclosure according to situations.

In the present disclosure, an “electrical connection” includes a case where constituent elements are connected through an element having some electrical function. The “element having some electrical function” is not particularly limited as long as electrical signals between the connected constituent elements may be transmitted. Examples of the “element having some electrical function” not only include electrodes and wirings, but also include switching elements such as transistors, resistors, inductors, capacitors, other elements with one or more functions, etc.

In the present disclosure, “parallel” refers to a state in which an angle formed by two straight lines is above −10 degrees and below 10 degrees, and thus may include a state in which the angle is above −5 degrees and below 5 degrees. In addition, “perpendicular” refers to a state in which an angle formed by two straight lines is above 80 degrees and below 100 degrees, and thus may include a state in which the angle is above 85 degrees and below 95 degrees.

In the present disclosure, “about” and “approximate” refer to a case that a boundary is defined not so strictly and a process and measurement error within a range is allowed. “Substantially the same” in the present disclosure refers to a case where numerical values differ within 10%.

In the present disclosure, a “width” refers to a dimension in a direction perpendicular to a direction of extension. A “length” refers to a dimension in the direction of extension.

In the present disclosure, a Micro-strip (MS) refers to a microwave transmission line consisting of a single conductor strip supported on a dielectric substrate, and a ground metal layer is fabricated on the other side of the dielectric substrate.

At least one embodiment of the present disclosure provides an antenna structure including a substrate, a ground layer, a radiation patch, a first feed structure, and a second feed structure. The radiation patch, the first feed structure, and the second feed structure are located on a first surface of the substrate, and the ground layer is located on a second surface of the substrate. The first surface and the second surface are two surfaces of the substrate facing away from each other. The radiation patch has a slotted structure. In a first direction, the first feed structure and the second feed structure are symmetrically located on both sides of the radiation patch.

In some exemplary implementation modes, the radiation patch is configured to introduce two resonant frequency points and one radiation zero point between the two resonant frequency points. The first feed structure and the second feed structure are configured to introduce another two radiation zero points.

According to the antenna structure of this embodiment, by providing the slotted structure on the radiation patch, two resonant frequency points are introduced and one radiation zero point is generated between the two resonant frequency points, and another two radiation zero points are introduced by using the symmetrical two feed structures, so that a differentially fed dual-frequency band-pass filtering antenna structure is achieved. The antenna structure of this embodiment may be used in n78 and n79 frequency bands of 5G without significantly increasing a profile of an antenna or introducing an additional discrete device, which may avoid large insertion loss. Moreover, the antenna structure of this embodiment may achieve relatively high pass band selectivity and relatively high out-of-band rejection characteristics.

In some exemplary implementation modes, the slotted structure is substantially symmetrical about a first centerline of the radiation patch in the first direction and is substantially symmetrical about a second centerline of the radiation patch in a second direction; and the second direction intersects the first direction. For example, the first direction is perpendicular to the second direction. In some examples, the first centerline of the radiation patch in the first direction may coincide with a first central axis of the antenna structure in the first direction, and the second centerline of the radiation patch in the second direction may coincide with a second central axis of the antenna structure in the second direction. However, this embodiment is not limited thereto. For example, the first centerline of the radiation patch in the first direction may not coincide with the first central axis of the antenna structure in the first direction.

In some exemplary implementation modes, an orthographic projection of the slotted structure on the substrate may be substantially H-shaped. However, this embodiment is not limited thereto.

In some exemplary implementation modes, the slotted structure may have a first slot, a second slot, and a third slot. The first slot and the third slot may be connected on both sides of the second slot symmetrically about the second centerline of the radiation patch in the second direction. The second slot is in communication with both the first slot and the third slot. In some examples, the second slot extends along second direction, the first slot and the third slot both extend along the first direction and the second slot may be located on the second centerline. However, this embodiment is not limited thereto.

In some exemplary implementation modes, a width of the second slot is less than a width of the first slot. In this example, the width of the first slot and a width of the third slot may be substantially the same and both are greater than the width of the second slot. However, this embodiment is not limited thereto.

In some exemplary implementation modes, orthographic projections of the first slot and the third slot on the substrate are straight line segments parallel to the second direction. However, this embodiment is not limited thereto.

In some exemplary implementation modes, the first slot has a first portion and a second portion in communication. Orthographic projections of the first portion and the second portion on the substrate are both L-shaped, and the first portion and the second portion are substantially symmetrical about the first centerline of the radiation patch in the first direction. In this example, a communication position of the first portion and the second portion communicates with the second slot. However, this embodiment is not limited thereto.

In some exemplary implementation modes, the first slot may have a third portion, a fourth portion, and a fifth portion in communication. The third portion and the fifth portion may be symmetrically connected on both sides of the fourth portion in the first direction. The fourth portion communicates with the second slot, and a width of the fourth portion gradually decreases along a direction away from a position of communication with the second slot until substantially the same as a width of the third portion. However, this embodiment is not limited thereto.

In some exemplary implementation modes, an orthographic projection of the second slot on the substrate may be a straight line segment parallel to the first direction. However, this embodiment is not limited thereto.

In some exemplary implementation modes, the second slot may include a first slit extending along the second direction and n second slits extending along the first direction. The n second slits are arranged sequentially along the second direction, and the first slit communicates with the n second slits, wherein n is greater than 0 and less than or equal to 3. In some examples, the second slot may include a first slit and a second slit, or may include a first slit and three second slits. However, this embodiment is not limited thereto.

In some exemplary implementation modes, any second slit is substantially symmetrical about the first centerline and n second slits are substantially symmetrical about the second centerline. In some examples, when n=1, a second slit may be located on the second centerline. When n=3, one of second slits may be located on the second centerline, and the other two slots may be symmetrically located on both sides of the aforementioned second slit along the second direction. However, this embodiment is not limited thereto.

In some exemplary implementation modes, the radiation patch has a first edge and a second edge in the first direction in a plane parallel to the substrate. The first feed structure is adjacent to the first edge of the radiation patch, and the second feed structure is adjacent to the second edge of the radiation patch. A pitch between the first feed structure and the first edge of the radiation patch may be less than or equal to a pitch between the second feed structure and the second edge of the radiation patch. In some examples, the pitch between the first feed structure and the first edge of the radiation patch may be substantially the same as the pitch between the second feed structure and the second edge of the radiation patch, or may be different. However, this embodiment is not limited thereto.

In some exemplary implementation modes, in the plane parallel to the substrate, the radiation patch has a first notch at the first edge and a second notch at the second edge. At least a portion of the first feed structure is located in the first notch, and at least a portion of the second feed structure is located in the second notch. In some examples the first notch and the second notch may be substantially symmetrical about the first centerline of the radiation patch in the first direction.

In some exemplary implementation modes, the first feed structure may include: a feed main body, a first branch, and a second branch. The first branch and the second branch may be electrically connected on both sides of the feed main body symmetrically about the centerline of the first feed structure in the second direction.

In some exemplary implementation modes, the feed main body of the first feed structure may include: a first feed main body and a second feed main body which are sequentially electrically connected. The first branch and the second branch are electrically connected on both sides of the first feed main body symmetrically about the centerline of the first feed structure in the second direction. A width of the first feed main body is greater than that of the second feed main body, and at least a portion of the second feed main body is located within the first notch of the radiation patch. Likewise, at least a portion of the second feed main body of the second feed structure may be located within the second notch of the radiation patch.

In some exemplary implementation modes, the first branch of the first feed structure may include a first feed branch and a first open-circuit branch. The first feed branch is electrically connected with the first feed main body and the first open-circuit branch. The first open-circuit branch is located on a side of the first feed branch away from the first feed main body. The second branch of the first feed structure may include a second feed branch and a second open-circuit branch. The second feed branch is electrically connected with the first feed main body and the second open-circuit branch. The second open-circuit branch is located on a side of the second feed branch away from the first feed main body.

In some exemplary implementation modes, the first open-circuit branch and the second open-circuit branch of the first feed structure are straight line segments parallel to the first direction. However, this embodiment is not limited thereto.

The antenna structure of this embodiment is described below through multiple examples.

Figure 2:
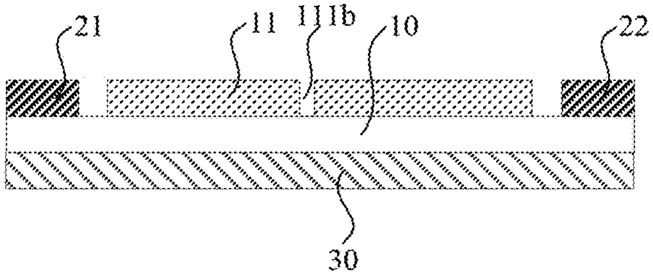
FIG. 2 is a partial cross-sectional schematic diagram of the antenna structure as shown in FIG. 1 along a second central axis OO'.

FIG. 1 is a schematic plan view of an antenna structure according to at least one embodiment of the present disclosure. FIG. 2 is a partial cross-sectional schematic diagram of the antenna structure as shown in FIG. 1 along a second central axis OO'. The second central axis OO' is a central axis of the antenna structure in a second direction D2, wherein the second central axis OO' is parallel to a first direction D1. The first direction D1 and the second direction D2 are in a same plane, and the first direction D1 is perpendicular to the second direction D2. A first central axis QQ' is a central axis of the antenna structure in the first direction D1, and the first central axis QQ' is parallel to the second direction D2.

In some exemplary implementation modes, as shown in FIGS. 1 and 2, the antenna structure of this embodiment includes a substrate 10, a ground layer 30, a radiation patch 11, a first feed structure 21, and a second feed structure 22. The radiation patch 11, the first feed structure 21, and the second feed structure 22 are located on a first surface of the substrate 10 and the ground layer 30 is located on a second surface of the substrate 10. The first surface and the second surface are two surfaces of the substrate 10 facing away from each other. In this example, the radiation patch 11 and the ground layer 30 are located on two opposite surfaces of the substrate 10 and the first feed structure 21 and the second feed structure 22 are located on a same surface of the substrate 10 as the radiation patch 11.

In some exemplary implementation modes, as shown in FIG. 1, the substrate 10 may have a rectangular shape. However, this embodiment is not limited thereto. For example, the substrate 10 may have a non-rectangular shape, such as a circular shape, a pentagon shape, or another shape.

In some exemplary implementation modes, as shown in FIG. 1 and FIG. 2, orthogonal projections of the radiation patch 11, the first feed structure 21, and the second feed structure 22 on the substrate 10 are not overlapped. In a plane parallel to the substrate 10, the first feed structure 21 and the second feed structure 22 are symmetrically located on both sides of the radiation patch 11 in the first direction D1. The first feed structure 21 and the second feed structure 22 may be substantially symmetrical about the first central axis QQ'. An orthographic projection of the ground layer 30 on the substrate 10 may include the orthographic projections of the radiation patch 11, the first feed structure 21, and the second feed structure 22 on the substrate 10. In this example, the first feed structure 21 is adjacently coupled to the radiation patch 11, and the second feed structure 22 is adjacently coupled to the radiation patch 11. The first feed structure 21 and the second feed structure 22 may be micro-strips that excite the radiation patch 11 through adjacent coupling. Moreover, the first feed structure 21 and the second feed structure 22 are symmetrically arranged on both sides of the radiation patch 11 in the first direction D1, so that differential feed may be achieved, and the radiation patch 11 is excited through a differential odd mode. The first feed structure 21 and the second feed structure 22 may introduce two radiation zero points, which are located in a high frequency band and a low frequency band respectively, through an impedance transformation design.

In some exemplary implementation modes, as shown in FIG. 1, the radiation patch 11 has a slotted structure 111. The slotted structure 111 may be substantially symmetrical about a first centerline of the radiation patch 11 in the first direction D1 and substantially symmetrical about a second centerline of the radiation patch 11 in the second direction D2. In this example, the first centerline of the radiation patch 11 may coincide with the first central axis QQ' of the antenna structure, and the second centerline of the radiation patch 11 may coincide with the second central axis OO' of the antenna structure. However, this embodiment is not limited thereto. In this example, by performing a slot design on the radiation patch 11, two resonant frequency bands and one radiation zero point located between the two resonant frequency points may be introduced. The antenna structure provided in this embodiment may achieve dual-frequency band-pass filtering.

In some exemplary implementation modes, as shown in FIG. 1, in a plane parallel to the substrate 10, the radiation patch 11 has a first edge 11*a* and a second edge 11*b* in the first direction D1, and has a third edge 11*c* and a fourth edge 11*d* in the second direction D2. Both the third edge 11*c* and the fourth edge 11*d* are parallel to the first direction D1. Two ends of the first edge 11*a* are respectively connected with the third edge 11*c* and the fourth edge 11*d*. Two ends of the second edge 11*b* are respectively connected with the third edge 11*c* and the fourth edge 11*d*. The first edge 11*a* is adjacent to the first feed structure 21 and the second edge 11*b* is adjacent to the second feed structure 22.

In some exemplary implementation modes, as shown in FIG. 1, the first edge 11*a* of the radiation patch 11 includes: a first line segment, a second line segment, a third line segment, a fourth line segment, and a fifth line segment that are sequentially connected. One end of the first line segment is connected with the third edge 11*c*, and the other end of the first line segment is connected with the second line segment. One end of the fifth line segment is connected with the fourth edge 11*d*, and the other end of the fifth line segment is connected with the fourth line segment. Extension directions of the first line segment, the third line segment, and the fifth line segment are parallel to the second direction D2, and extension directions of the second line segment and the fourth line segment are parallel to the first direction D1. The second edge 11*b* of the radiation patch 11 includes: a sixth line segment, a seventh line segment, an eighth line segment, a ninth line segment, and a tenth line segment that are sequentially connected. One end of the sixth line segment is connected with the third edge 11*c*, and the other end of the sixth line segment is connected with the seventh line segment. One end of the tenth line segment is connected with the fourth edge 11*d*, and the other end of the tenth line segment is connected with the ninth line segment. Extension directions of the sixth line segment, the eighth line segment, and tenth line segment are parallel to the second direction D2, and extension directions of the seventh line segment and the ninth line segment are parallel to the first direction D1.

In some exemplary implementation modes, as shown in FIG. 1, the radiation patch 11 is symmetrical about the second central axis OO'. Lengths of the third edge 11*c* and the fourth edge 11*d* of the radiation patch 11 are substantially the same. Lengths of the first line segment and the fifth line segment of the first edge 11*a* are substantially the same, and lengths of the second line segment and the fourth line segment of the first edge 11*a* are substantially the same. Lengths of the sixth line segment and the tenth line segment of the second edge 11*b* are substantially the same, and lengths of the seventh line segment and the ninth line segment of the second edge 11*b* are substantially the same.

In some exemplary implementation modes, as shown in FIG. 1, the radiation patch 11 is symmetrical about the first central axis QQ'. A length of the first line segment of the first edge 11*a* and a length of the sixth line segment of the second edge 11*b* of the radiation patch 11 are substantially the same, a length of the second line segment of the first edge 11*a* and a length of the seventh line segment of the second edge 11*b* are substantially the same, and a length of the third line segment of the first edge 11*a* and a length of the eighth line segment of the second edge 11*b* are substantially the same. A length of the fourth line segment of the first edge 11*a* and a length of the ninth line segment of the second edge 11*b* are substantially the same. A length of the fifth line segment of the first edge 11*a* and a length of the tenth line segment of the second edge 11*b* are substantially the same.

In some exemplary implementation modes, as shown in FIG. 1, in a plane parallel to the substrate 10, the radiation patch 11 has a first notch 110*a* and a second notch 110*b*. The first notch 110*a* is at the first edge 11*a* of the radiation patch 11 and is surrounded by the second line segment, the third line segment, and the fourth line segment of the first edge 11*a*. The second notch 110*b* is at the second edge 11*b* of the radiation patch 11 and is surrounded by the seventh line segment, the eighth line segment, and the ninth line segment of the second edge 11*b*. In this example, the first edge 11*a* is notched toward a side close to the second edge 11*b* to form the first notch 110*a* and the second edge 11*b* is notched toward a side close to the first edge 11*a* to form the second notch 110*b*.

In some exemplary implementation modes, as shown in FIG. 1, at least a portion of the first feed structure 21 is located within the first notch 110*a* of the radiation patch 11. There is a first pitch between the first feed structure 21 other than the first notch 110*a* and the first edge 11*a* of the radiation patch 11, and there is a second pitch between the first feed structure 21 within the first notch 110*a* and the third line segment of the first edge 11*a* of the radiation patch 11. At least a portion of the second feed structure 22 is located within the second notch 110*b* of the radiation patch 11. There is a third pitch between the second feed structure 22 other than the second notch 110*b* and the second edge 11*b* of the radiation patch 11, and there is a fourth pitch between the second feed structure 22 within the second notch 110*b* and the eighth line segment of the second edge 11*b* of the radiation patch 11. In this example, the first pitch and the third pitch may be substantially the same, the second pitch and the fourth pitch may be substantially the same, the first pitch may be different from the second pitch, for example, the first pitch may be less than the second pitch. However, this embodiment is not limited thereto. For example, the first pitch may be different from the third pitch and the second pitch may be different from the fourth pitch. Or, the first pitch, the second pitch, the third pitch, and the fourth pitch may be substantially the same.

In some exemplary implementation modes, as shown in FIG. 1, in a plane parallel to the substrate 10, the slotted structure 111 of the radiation patch 11 may be substantially symmetrical about the first central axis QQ' and may also be substantially symmetrical about the second central axis OO'. An orthographic projection of the slotted structure 111 on the substrate 10 may be approximately H-shaped. The slotted structure 111 may have a first slot 111*a*, a second slot 111*b*, and a third slot 111*c*. The second slot 111*b* is located between the first slot 111*a* and the third slot 111*c* in the second direction D2 and communicates with the first slot 111*a* and the third slot 111*c*. The first slot 111*a* and the third slot 111*c* may be symmetrically connected on both sides of the second slot 111*b* about the second central axis OO'. The second slot 111*b* may be located on the first central axis QQ'. The first slot 111*a* and the third slot 111*c* may extend along the first direction D1 and the second slot 111*b* may extend along the second direction D2. A width of the second slot 111*b* (i.e., a length along the first direction D1) may be less than a width of the first slot 111*a* (i.e., a length along the second direction D2) and also be less than a width of the third slot 111*c* (i.e., a length along the second direction D2).

In some exemplary implementation modes, as shown in FIG. 1, an orthographic projection of the second slot 111*b* on the substrate 10 may have an elongated rectangular shape. The first slot 111*a* may have a first portion and a second portion in communication. The first portion and the second portion are substantially symmetrical about the first central axis QQ', and orthographic projections of the first portion and the second portion on the substrate 10 are both L-shaped. In this example, a communication position of the first portion and the second portion of the first slot 111*a* communicates with the second slot 111*b*. A structure of the third slot 111*c* may be referred to a structure of the first slot 111*a* and therefore will not be repeated here.

In some exemplary implementation modes, as shown in FIG. 1, the first feed structure 21 and the second feed structure 22 are symmetrical about the first central axis QQ'. The following description will be given by taking the first feed structure 21 as an example. The first feed structure 21 may include: a first feed main body 211*a*, a second feed main body 211*b*, a first branch, and a second branch. Both the first feed main body 211*a* and the second feed main body 211*b* extend along the first direction D1, and the first feed main body 211*a* is electrically connected with the second feed main body 211*b*. A width of the first feed main body 211*a* (i.e. a length along the second direction D2) is larger than a width of the second feed main body 211*b* (i.e. a length along the second direction D2). One end of the second feed main body 211*b* of the first feed structure 21 is inserted into the first notch 110*a* of the radiation patch 11.

In some exemplary implementation modes, as shown in FIG. 1, the first branch and the second branch of the first feed structure 21 are electrically connected on both sides of the first feed main body 211*a* symmetrically about the second central axis OO'. The first branch of the first feed structure 21 includes a first feed branch 212*a* and a first open-circuit branch 213*a*. The first feed branch 212*a* is electrically connected with the first feed main body 211*a* and the first open-circuit branch 213*a*, and the first open-circuit branch 213*a* is located on a side of the first feed branch 212*a* away from the first feed main body 211*a*. The second branch of the first feed structure 21 includes a second feed branch 212*b* and a second open-circuit branch 213*b*. The second feed branch 212*b* is electrically connected with the first feed main body 211*a* and the second open-circuit branch 213*b*, and the second open-circuit branch 213*b* is located on a side of the second feed branch 212*b* away from the first feed main body 211*a*. A width of the first feed main body 211*a* (i.e., a length along the second direction D2) is larger than a width of the first feed branch 212*a* (i.e., a length along the first direction D1), and a width of the first feed branch 212*a* and a width of the first open-circuit branch 213*a* (i.e., a length along the second direction D2) may be substantially the same. The first feed branch 212*a* may be adjacent to the first line segment of the first edge 11*a* of the radiation patch 11, the second feed branch 212*b* may be adjacent to the fifth line segment of the first edge 11*a* of the radiation patch 11, the first open-circuit branch 213*a* may be adjacent to the third edge 11*c* of the radiation patch 11, and the second open-circuit branch 213*b* may be adjacent to the fourth edge 11*d* of the radiation patch 11.

In some exemplary implementation modes, as shown in FIG. 1, a structure of the second feed structure 22 is substantially the same as a structure of the first feed structure 21. Among them, one end of the second feed main body of the second feed structure 22 extends into the second notch 110*b* of the radiation patch 11. For the rest of the structure of the second feed structure 22, reference may be made to the description of the structure of the first feed structure 21, and therefore will not be repeated here.

In some exemplary implementation modes, the antenna structure may be obtained using a circuit board preparation process. However, this embodiment is not limited thereto.

Figure 3:
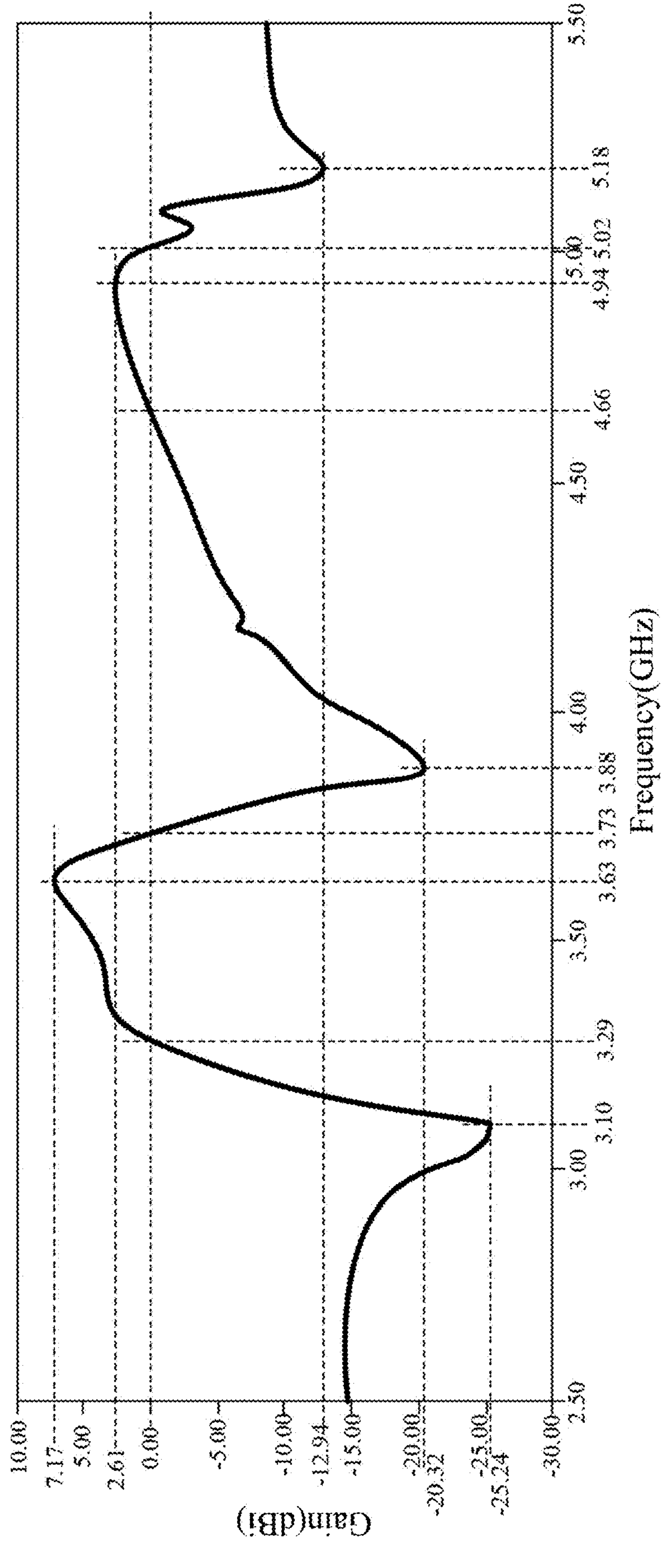
FIG. 3 is a simulation result diagram of a gain curve of the antenna structure as shown in FIG. 1.

FIG. 3 is a simulation result diagram of a gain curve of the antenna structure as shown in FIG. 1. In the present disclosure, a planar dimension is represented as a first length×a second length, wherein the first length is a length along the first direction D1, and the second length is a length along the second direction D2. A thickness is a length in a direction perpendicular to a plane where the first direction D1 and the second direction D2 are located.

In some exemplary implementation modes, the radiation patch 11, the ground layer 30, the first feed structure 21, and the second feed structure 22 may be made of metal materials with good electrical conductivity, for example, any one or more of gold (Au), silver (Ag), copper (Cu), and aluminum (Al), or an alloy made of any one or more of the above metals. In some examples, materials of the radiation patch 11, the ground layer 30, the first feed structure 21, and the second feed structure 22 may be copper (Cu). However, this embodiment is not limited thereto.

In some exemplary implementation modes, the substrate 10 has a planar dimension of about 54.00 mm×50.00 mm. Lengths of the third edge 11*c* and the fourth edge 11*d* of the radiation patch 11 are both about 40.60 mm, and a distance between the third edge 11*c* and the fourth edge 11*d* is about 34.50 mm. A length of the first line segment of the first edge 11*a* of the radiation patch 11 is about 16.25 mm, a length a7 of the second line segment of the first edge 11*a* is about 14.50 mm, and a length a8 of the third line segment is about 2.00 mm. A length a1 of the first slot 111*a* of the slotted structure 111 of the radiation patch 11 in the first direction D1 is about 39.00 mm, a width a3 of the first slot 111*a* is about 1.00 mm, and a length a2 of the first portion of the first slot 111*a* in the second direction D2 is about 0.50 mm. A pitch a5 between the first slot 111*a* and the third edge 11*c* is about 0.50 mm, and a pitch a4 between the first slot 111*a* and the first line segment of the first edge 11*a* is about 0.80 mm. A length A6 of the second slot 111*b* along the second direction D2 is about 31.50 mm, and a width a9 (i.e., a length along the first direction D1) of the second slot 111*b* is about 0.30 mm.

In some exemplary implementation modes, as shown in FIG. 1, a width B1 (i.e., a length along the second direction D2) of the first feed main body 211*a* of the first feed structure 21 is about 2.20 mm, and a distance b2 from an end of the first feed main body 211*a* to the first feed branch 212*a* is about 6.00 mm. A distance b5 from an end of the first feed branch 212*a* close to the first open-circuit branch 213*a* to an end of the second feed branch 212*b* close to the second open-circuit branch 213*b* is about 40.00 mm, a width b6 (i.e., a length along the first direction D1) of the first feed branch 212*a* is about 0.60 mm, and a length b7 of the first open-circuit branch 213*a* along the first direction D1 is about 6.60 mm. A length b3 of the second feed main body 211*b* along the first direction D1 is about 14.10 mm, and a width b4 (i.e., a length along the second direction D2) of the second feed main body 211*b* is about 0.20 mm. A second pitch c2 between the second feed main body 211*b* and the third line segment of the first edge 11*a* is about 0.50 mm, a first pitch between the first feed branch 212*a* and the first line segment of the first edge 11*a*, and a first pitch c1 between the second feed branch 212*b* and the fifth line segment of the first edge 11*a* are about 0.10 mm.

In some exemplary implementation modes, a thickness of the antenna structure is about $0.013\lambda_0$. $\lambda_0$ represents a vacuum wavelength. As shown in FIG. 3, a gain bandwidth of the antenna structure at 0 dBi is about 3.29 GHz to 3.73 GHz and 4.66 GHz to 5.02 GHz. A maximum gain in an n78 frequency band is about 7.17 dBi and passband selectivity is about −32 dBi and −27 dBi, respectively, and a maximum gain in an n79 frequency band is about 2.61 dBi and passband selectivity is about −23 dBi and −15 dBi.

A gain bandwidth of the antenna structure of the exemplary embodiment may cover ranges of n78 and n79 frequency bands and performance in the n78 frequency band is better than performance in the n79 frequency band. The antenna structure of the exemplary embodiment may meet requirements of a mobile terminal device for antenna performance and thinning.

Figure 4A:
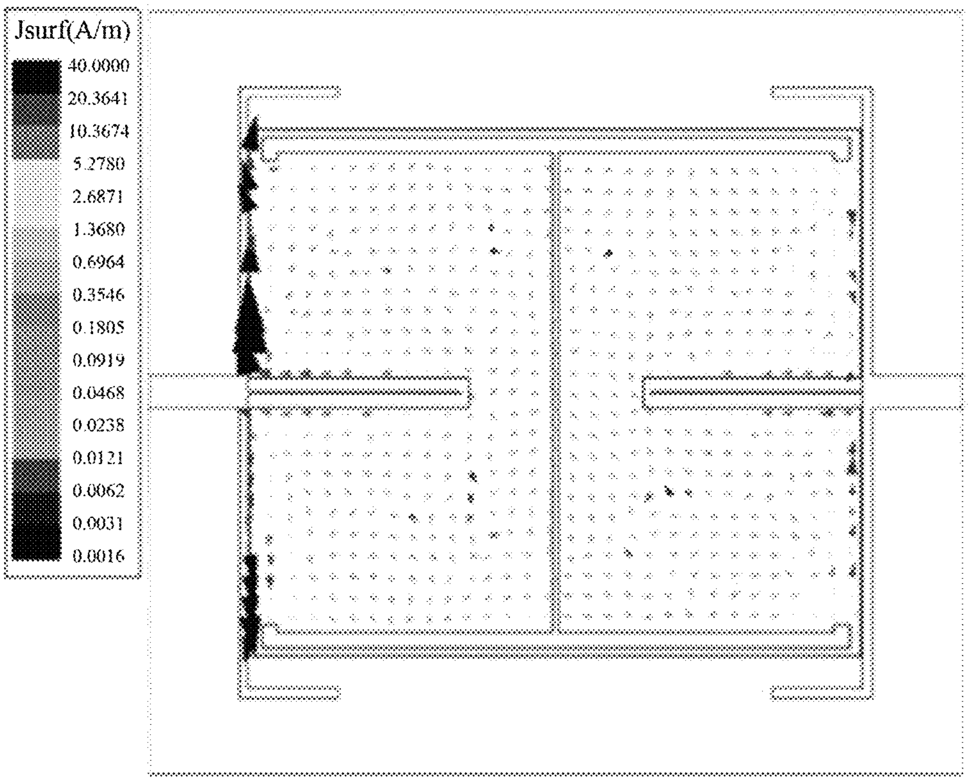
FIG. 4A to FIG. 4C are surface current vector distribution diagrams of a radiation patch of the antenna structure shown in FIG. 1.
Figure 4B:
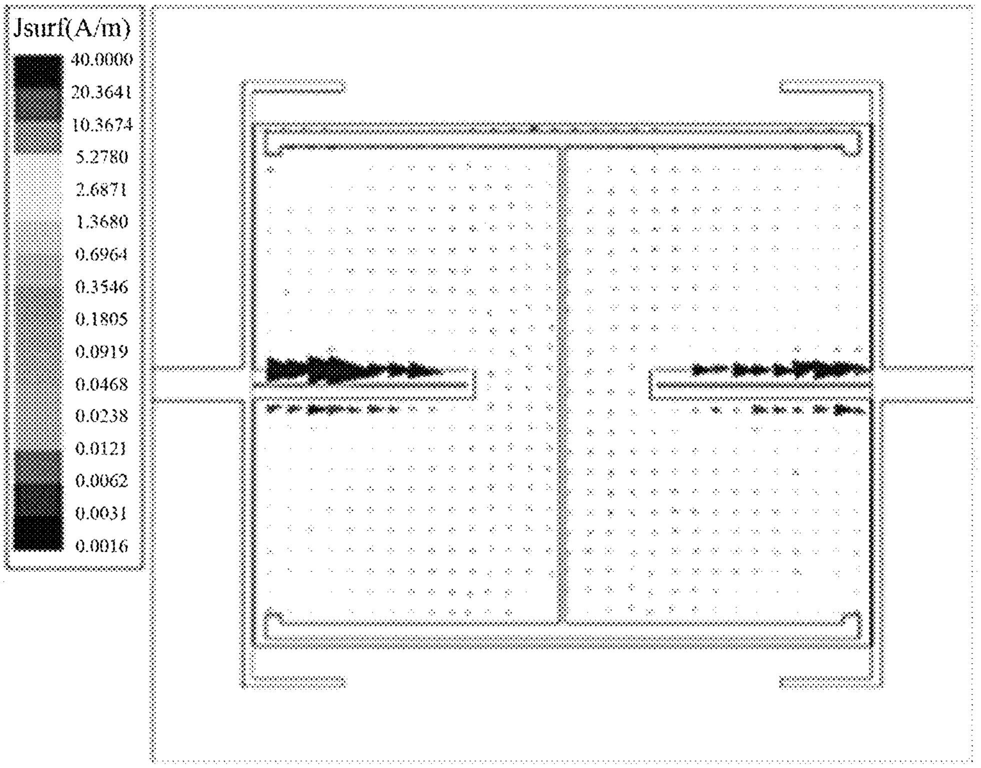
Figure 4C:
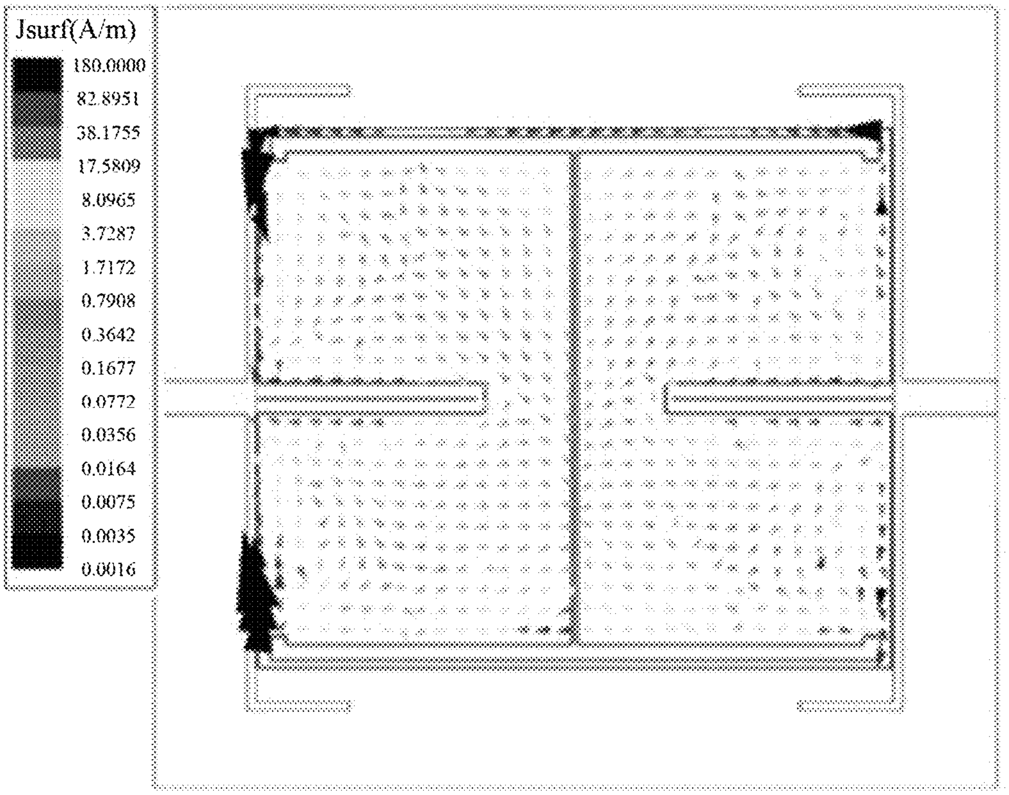

FIG. 4A to FIG. 4C are surface current vector distribution diagrams of a radiation patch of the antenna structure shown in FIG. 1. FIG. 4A is a surface current vector distribution diagram of the antenna structure shown in FIG. 1 at a first radiation zero point (i.e. a corresponding frequency point is about 3.10 GHz). FIG. 4B is a surface current vector distribution diagram of the antenna structure shown in FIG. 1 at a second radiation zero point (i.e. a corresponding frequency point is about 3.88 GHZ). FIG. 4C is a surface current vector distribution diagram of the antenna structure shown in FIG. 1 at a third radiation zero point (i.e. a corresponding frequency point is about 5.18 GHZ). As shown in FIG. 4A, in a case of excitation of the first feed structure 21, a surface current intensity of an edge of the radiation patch 11 is maximum in the second direction D2, but currents are in opposite directions and cancel each other to form a radiation zero point. As shown in FIG. 4B, in a case of excitation of the first feed structure 21, in the first direction D1, a current intensity of the radiation patch 11 at a notch along a second centerline of the radiation patch 11 is maximum, but in the second direction D2, surface currents on both sides of the slotted structure are in opposite directions and may cancel each other to form a radiation zero point. As shown in FIG. 4C, in a case of excitation of the first feed structure 21, a surface current intensity at a corner of the radiation patch 11 in the second direction D2 is maximum, but surface currents on both sides of the slotted structure are in opposite directions and may cancel each other to form a radiation zero point. As may be seen from FIGS. 4A to 4C, one radiation zero point may be introduced by providing the slotted structure in the radiation patch, and remaining two radiation zero points may be introduced by providing two symmetrical feed structures.

Figure 5:
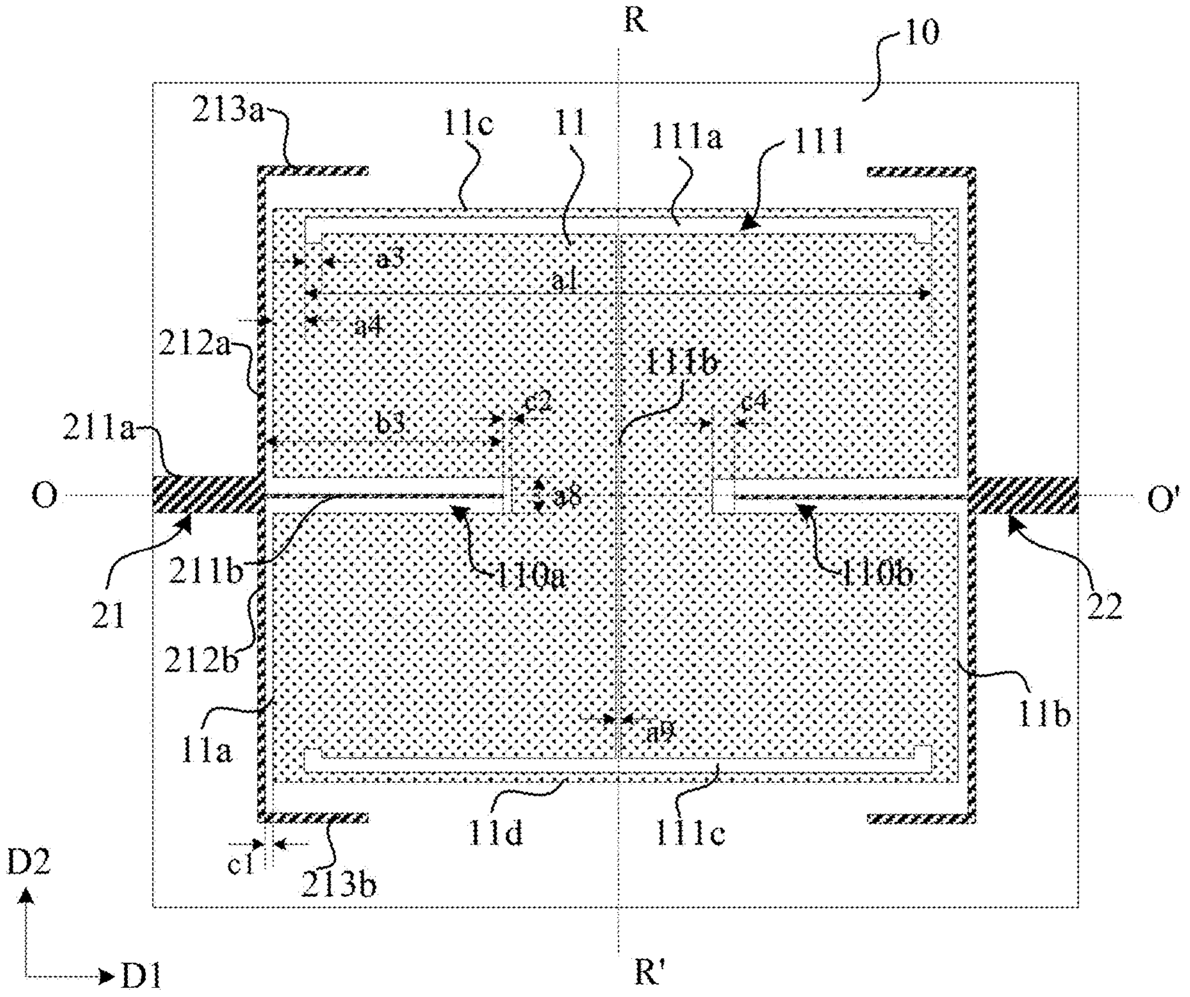
FIG. 5 is another schematic plan view of an antenna structure according to at least one embodiment of the present disclosure.
Figure 6:
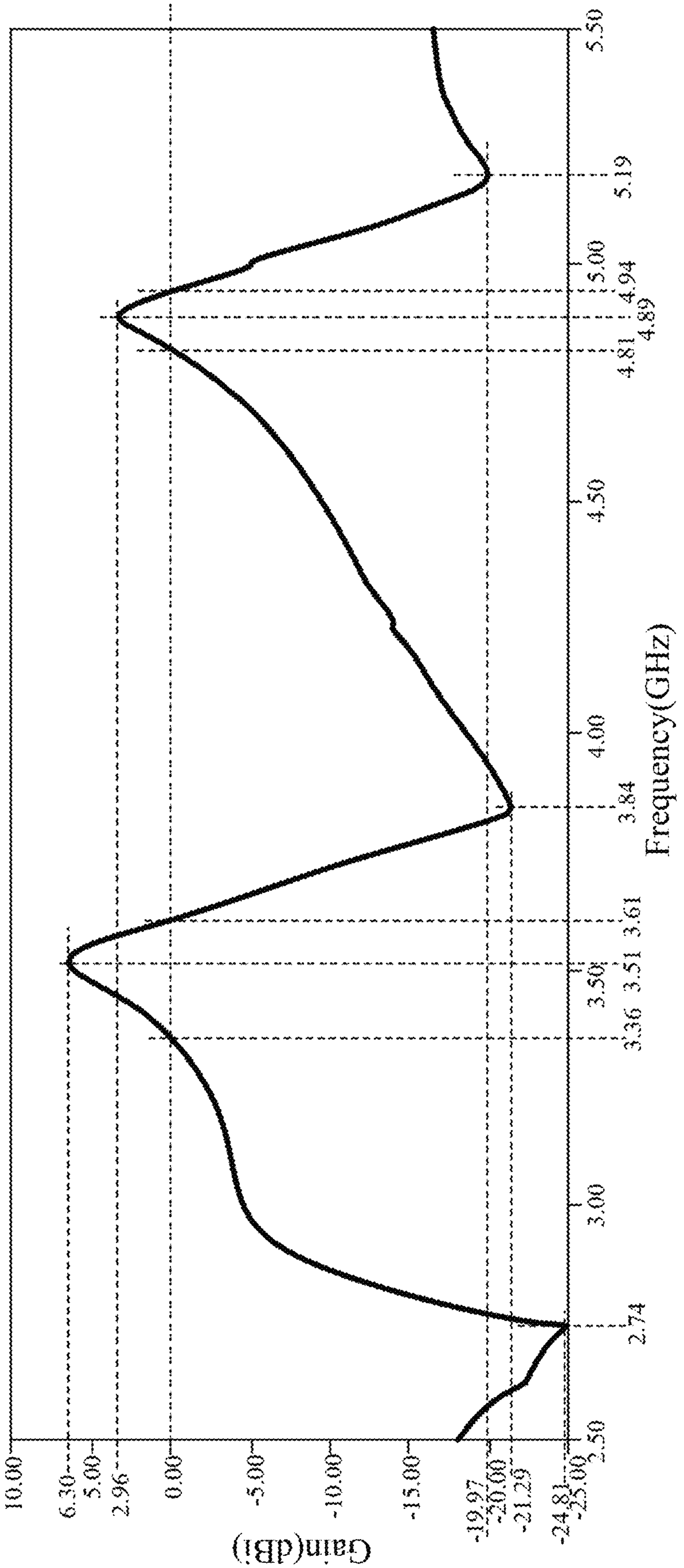
FIG. 6 is a simulation result diagram of a gain curve of the antenna structure as shown in FIG. 5.

FIG. 5 is another schematic plan view of an antenna structure according to at least one embodiment of the present disclosure. FIG. 6 is a simulation result diagram of a gain curve of the antenna structure as shown in FIG. 5.

In some exemplary implementation modes, as shown in FIG. 5, a pitch between the first feed structure 21 and the radiation patch 11 is different from a pitch between the second feed structure 22 and the radiation patch 11. In this example, a first centerline RR' of the radiation patch 11 along the first direction D1 may not coincide with a first central axis of the antenna structure along the first direction D1. A second centerline of the radiation patch 11 along the second direction D2 may coincide with a second central axis OO' of the antenna structure along the second direction D2.

In some exemplary implementation modes, a first pitch between the first feed branch 212*a* and the second feed branch 212*b* of the first feed structure 21, and the first edge 11*a* of the radiation patch 11, is less than a third pitch between the first feed branch and the second feed branch of the second feed structure 22, and the second edge 11*b* of the radiation patch 11. A second pitch between the second feed main body 211*b* of the first feed structure 21 and the third line segment of the first edge 11*a* of the radiation patch 11 is less than a fourth pitch between the second feed main body of the second feed structure 22 and the eighth line segment of the second edge 11*b* of the radiation patch 11. For rest of the structure of the antenna structure of the exemplary embodiment, reference may be made to the description of the foregoing embodiments, and thus will not be repeated herein.

In some exemplary implementation modes, the substrate 10 has a planar dimension of about 56.00 mm×50.00 mm. Lengths of the third edge 11*c* and the fourth edge 11*d* of the radiation patch 11 are both about 41.60 mm. A length a8 of the third line segment of the first edge 11*a* of the radiation patch 11 is about 2.40 mm. A length a1 of the first slot 111*a* of the slotted structure 111 of the radiation patch 11 along the first direction D1 is about 38.00 mm, a width a3 of the first slot 111*a* is about 1.20 mm, a pitch a4 between the first slot 111*a* and the first line segment of the first edge 11*a* is about 1.80 mm, and a width a9 (i.e., a length along the first direction D1) of the second slot 111*b* is about 0.20 mm. A length b3 of the second feed main body 211*b* of the first feed structure 21 along the first direction D1 is about 14.60 mm. A first pitch between the first feed branch 212*a* of the first feed structure 21 and the first edge 11*a* of the radiation patch 11, a first pitch c1 between the second feed branch 212*b* and the first edge 11*a* of the radiation patch 11 are about 0.60 mm, and a second pitch c2 between the second feed main body 211*b* of the first feed structure 21 and the third line segment of the first edge 11*a* is about 0.50 mm. A third pitch between the first feed branch and the second feed branch of the second feed structure 22, and the second edge 11*b* of the radiation patch 11 is about 1.10 mm, and a fourth pitch c4 between the second feed main body of the second feed structure 21 and the eighth line segment of the second edge 11*b* is about 1.00 mm.

For remaining parameters of the antenna structure of the embodiment, reference may be made to the description of the embodiment shown in FIG. 1, and thus will not be repeated herein.

In some exemplary implementation modes, a thickness of the antenna structure is about $0.0132\lambda_0$. $\lambda_0$ represents a vacuum wavelength. As shown in FIG. 6, a gain bandwidth of the antenna structure at 0 dBi is about 3.36 GHz to 3.61 GHz and 4.81 GHz to 4.94 GHz. A maximum gain in the n78 frequency band is about 6.30 dBi and passband selectivity is about −31 dBi and −27 dBi, and a maximum gain in the n79 frequency band is about 2.96 dBi and passband selectivity is about −24 dBi and −23 dBi.

A gain bandwidth of the antenna structure of the exemplary embodiment may cover ranges of n78 and n79 frequency bands and performance in the n78 frequency band is better than performance in the n79 frequency band. The antenna structure of the exemplary embodiment may meet requirements of the mobile terminal device for antenna performance and thinning.

Compared with a simulation result of the antenna structure shown in FIG. 1, bandwidths of the antenna structure of this example are obviously reduced in two passbands of 0 dBi gain, and a frequency point corresponding to a second radiation zero point (about 3.8 GHz) is basically unchanged. An asymmetric design of a pitch between the feed structures and the radiation patch is adopted for the antenna structure of this example, only symmetry of a distribution of a current on a left side of the radiation patch is affected adversely, and leaky wave characteristics of the antenna structure is not affected. It may be seen from simulation results of antenna structures shown in FIGS. 1 and 5 that symmetry of an overall antenna structure is critical for a differentially fed dual-frequency filtering antenna.

Figure 7:
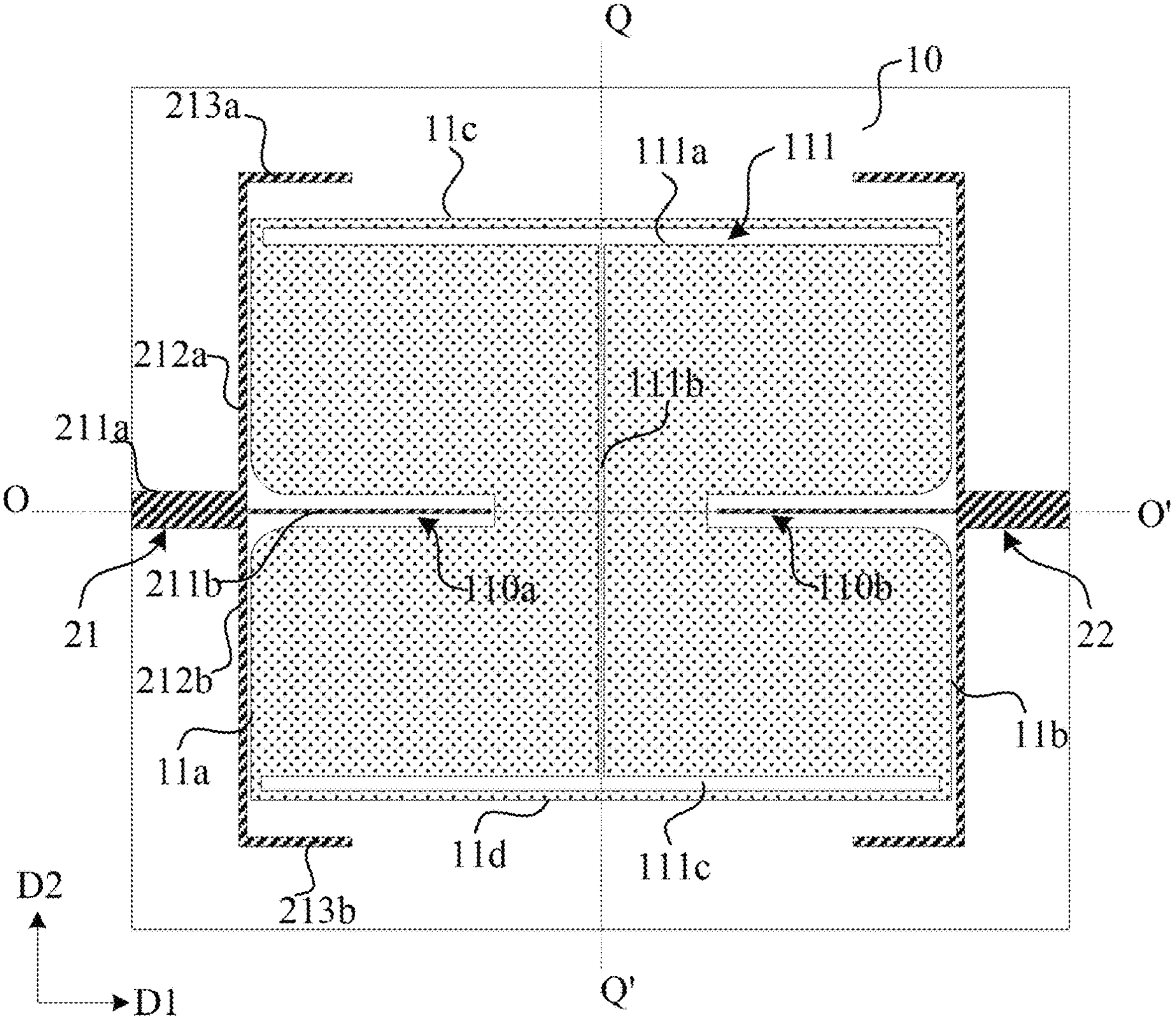
FIG. 7 is another schematic plan view of an antenna structure according to at least one embodiment of the present disclosure.
Figure 8:
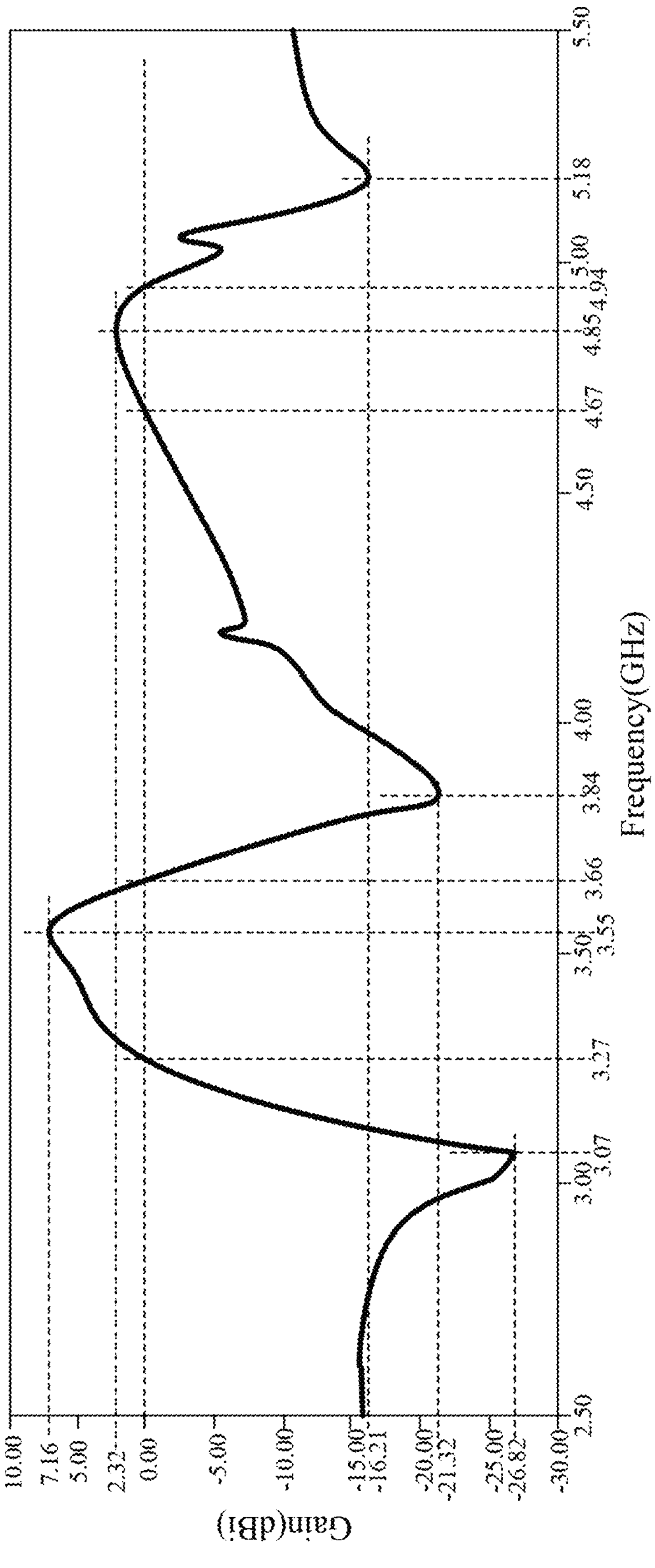
FIG. 8 is a simulation result diagram of a gain curve of the antenna structure as shown in FIG. 7.

FIG. 7 is another schematic plan view of an antenna structure according to at least one embodiment of the present disclosure. FIG. 8 is a simulation result diagram of a gain curve of the antenna structure as shown in FIG. 7.

In some exemplary implementation modes, as shown in FIG. 7, the first edge 11*a* of the radiation patch 11 includes: a first line segment, a first arc line segment, a second line segment, a third line segment, a fourth line segment, a second arc line segment, and a fifth line segment that are sequentially connected. The second edge 11*b* includes a sixth line segment, a third arc line segment, a seventh line segment, an eighth line segment, a ninth line segment, a fourth arc line segment, and a tenth line segment that are sequentially connected. In this example, radians of the first arc line segment, the second arc line segment, the third arc line segment, and the fourth arc line segment may be substantially the same. However, this embodiment is not limited thereto.

In some exemplary implementation modes, as shown in FIG. 7, the slotted structure 111 of the radiation patch 11 includes: a first slot 111*a*, a second slot 111*b*, and a third slot 111*c*. Among them, the first slot 111*a* and the third slot 111*c* are straight line segments extending along the first direction D1. The second slot 111*b* extends along the second direction D2 and communicates with the first slot 111*a* and the third slot 111*c*.

For rest of the structure of the antenna structure of the exemplary embodiment, reference may be made to the description of the foregoing embodiments, and thus will not be repeated herein.

In some exemplary implementation modes, the substrate 10 has a planar dimension of about 55.00 mm×50.00 mm. For remaining parameters of the antenna structure of the embodiment, reference may be made to the description of the embodiment shown in FIG. 1, and thus will not be repeated herein.

In some exemplary implementation modes, a thickness of the antenna structure is about $0.013\lambda_0$. $\lambda_0$ represents a vacuum wavelength. As shown in FIG. 8, a gain bandwidth of the antenna structure at 0 dBi is about 3.27 GHz to 3.66 GHz and 4.67 GHz to 4.94 GHz. A maximum gain in the n78 frequency band is about 7.16 dBi and passband selectivity is about −34 dBi and −28 dBi, and a maximum gain in the n79 frequency band is about 2.32 dBi and passband selectivity is about −24 dBi and −18 dBi.

A gain bandwidth of the antenna structure of the exemplary embodiment may cover ranges of n78 and n79 frequency bands and performance in the n78 frequency band is better than performance in the n79 frequency band. The antenna structure of the exemplary embodiment may meet requirements of the mobile terminal device for antenna performance and thinning. Compared with the antenna structure shown in FIG. 1, according to the antenna structure of this example, a shape of the slotted structure of the radiation patch and shapes of the first edge and the second edge are adjusted, but consistency of a pitch between the first feed structure and the radiation patch and a pitch between the second feed structure and the radiation patch is maintained. Compared with the simulation result of the antenna structure shown in FIG. 1, a gain curve of the antenna structure of this example is substantially consistent with the gain curve of the antenna structure shown in FIG. 1, indicating that fine adjustment of the slotted structure, the first edge and the second edge of the radiation patch will not significantly change performance of the antenna structure in a case of maintaining the consistency of the pitch between the first feed structure and the radiation patch and the pitch between the second feed structure and the radiation patch.

Figure 9:
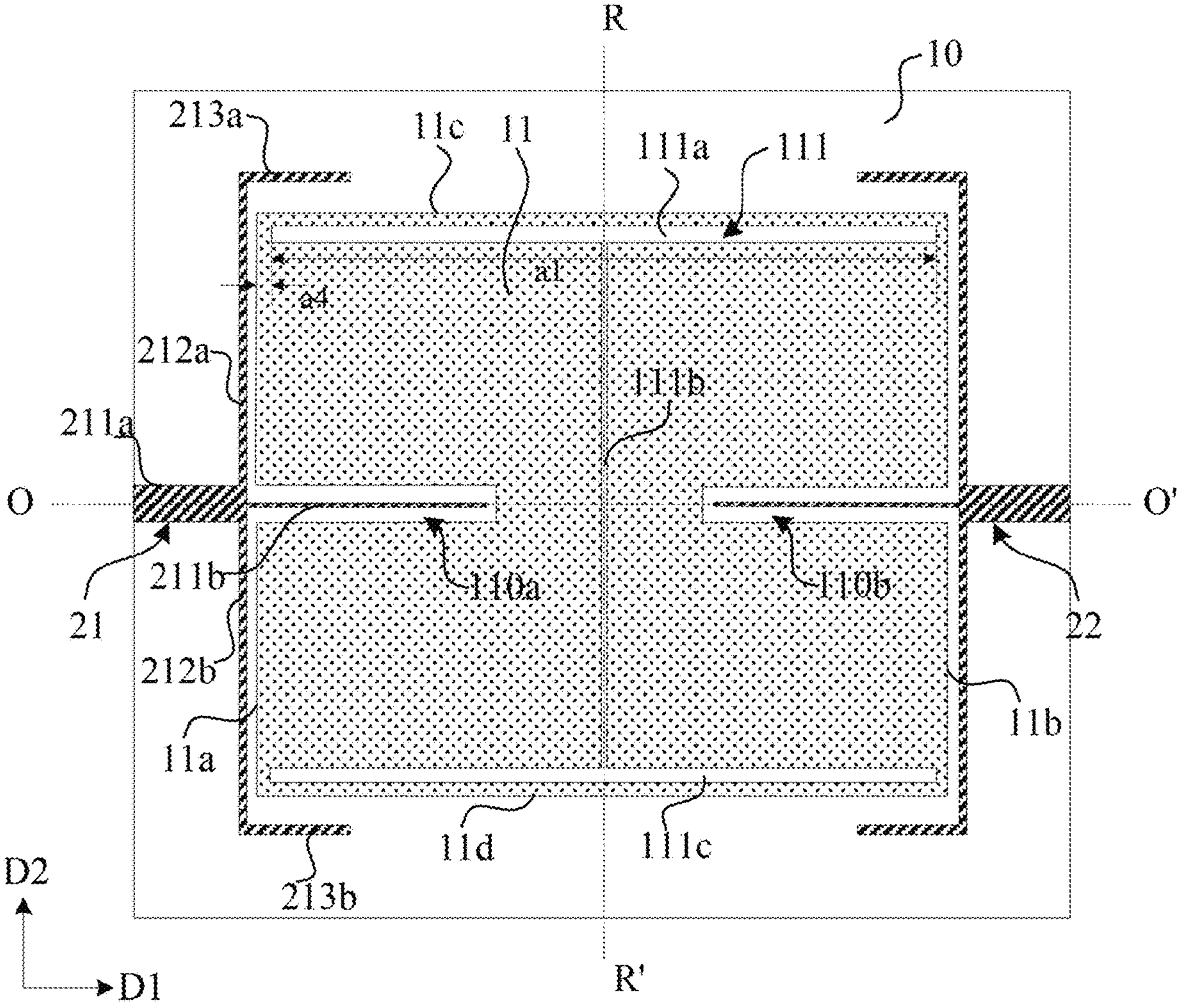
FIG. 9 is another schematic plan view of an antenna structure according to at least one embodiment of the present disclosure.
Figure 10:
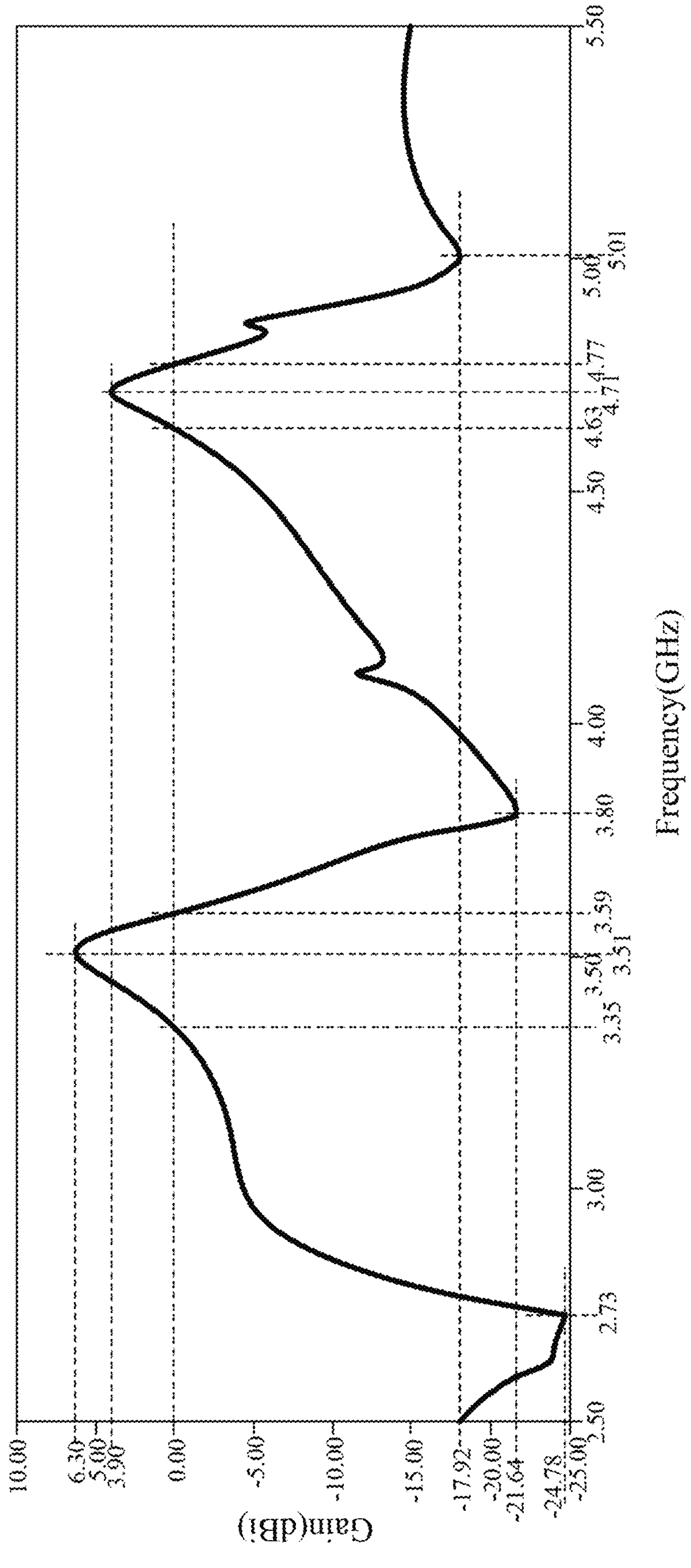
FIG. 10 is a simulation result diagram of a gain curve of the antenna structure as shown in FIG. 9.

FIG. 9 is another schematic plan view of an antenna structure according to at least one embodiment of the present disclosure. FIG. 10 is a simulation result diagram of a gain curve of the antenna structure as shown in FIG. 9.

In some exemplary implementation modes, as shown in FIG. 9, a pitch between the first feed structure 21 and the radiation patch 11 is different from a pitch between the second feed structure 22 and the radiation patch 11. The first slot 111*a* and the third slot 111*c* of the slotted structure 111 of the radiation patch 11 may be straight line segments extending along the first direction D1. For rest of the structure of the antenna structure of the exemplary embodiment, reference may be made to the description of the foregoing embodiments, and thus will not be repeated herein.

In some exemplary implementation modes, the substrate 10 has a planar dimension of about 55.00 mm×50.00 mm. A length a1 of the first slot 111*a* of the slot structure 111 of the radiation patch 11 along the first direction D1 is about 40.00 mm. A pitch a4 between the first slot 111*a* and the first line segment of the first edge 11*a* is about 0.80 mm. For remaining parameters of the antenna structure of the embodiment, reference may be made to the description of the embodiment shown in FIG. 5, and thus will not be repeated herein.

In some exemplary implementation modes, a thickness of the antenna structure is about $0.013\lambda_0$. $\lambda_0$ represents a vacuum wavelength. As shown in FIG. 10, a gain bandwidth of the antenna structure at 0 dBi is about 3.35 GHz to 3.59 GHz and 4.63 GHz to 4.77 GHz. A maximum gain in the n78 frequency band is about 6.30 dBi and passband selectivity is about −31 dBi and −28 dBi, and a maximum gain in the n79 frequency band is about 3.90 dBi and passband selectivity is about −25 dBi and −22 dBi.

A gain bandwidth of the antenna structure of the exemplary embodiment may cover ranges of n78 and n79 frequency bands and performance in the n78 frequency band is better than performance in the n79 frequency band. The antenna structure of the exemplary embodiment may meet requirements of the mobile terminal device for antenna performance and thinning.

Compared with the antenna structure shown in FIG. 7, according to the antenna structure of this example, a pitch between the first feed structure and the radiation patch and a pitch between the second feed structure and the radiation patch is different. Compared with the simulation result of the antenna structure shown in FIG. 7, bandwidths of the antenna structure of this example are obviously reduced in two passbands of 0 dBi gain, and a frequency point corresponding to a second radiation zero point (about 3.8 GHz) is basically unchanged. An asymmetric design of a pitch between the feed structures and the radiation patch is adopted for the antenna structure of this example, only symmetry of a distribution of a current on a left side of the radiation patch is affected adversely, and leaky wave characteristics of the antenna structure is not affected.

Compared with the antenna structure shown in FIG. 5 according to the antenna structure of this example, a shape of the slotted structure of the radiation patch is adjusted. Compared with the simulation result of the antenna structure shown in FIG. 5, a bandwidth range of 0 dBi gain of the antenna structure of this example is shifted to a low frequency, and especially a shift of a high frequency passband is more obvious. In this example, a surface current distribution path will be changed by changing a slot shape of the radiation patch, intensities of currents at an edge of the radiation patch and an edge of a slotted slot is relatively large, and the radiation patch and the feed structures are adjacently coupled, so the greater the intensity of the current is, the stronger the energy coupling between them is, and a coupling intensity between them affects a resonant frequency shift of the antenna structure. A coupling strength between the radiation patch and the feed structures of the antenna structure in this example is greater, so a phenomenon of shifting to a low frequency occurs.

Figure 11:
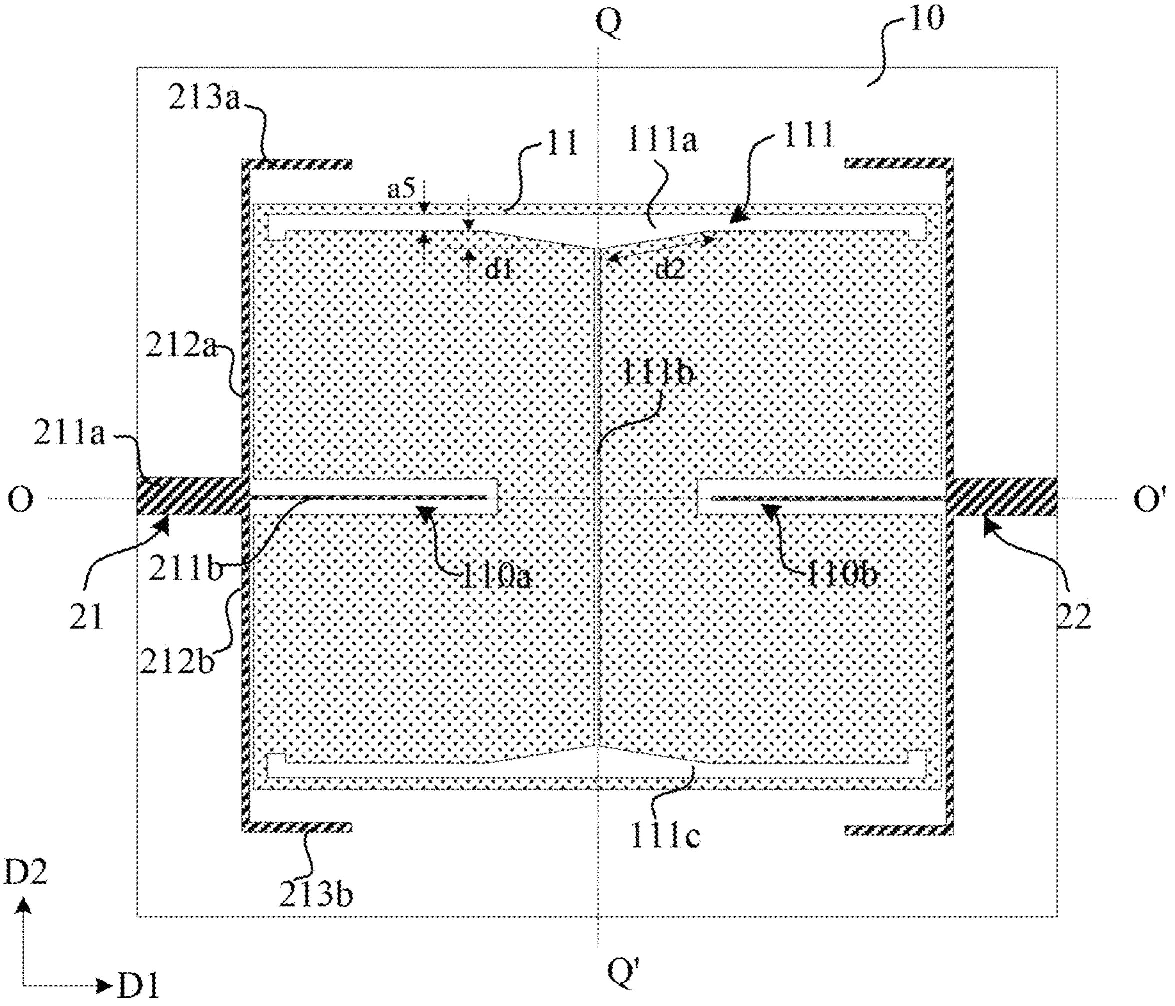
FIG. 11 is another schematic plan view of an antenna structure according to at least one embodiment of the present disclosure.
Figure 12:
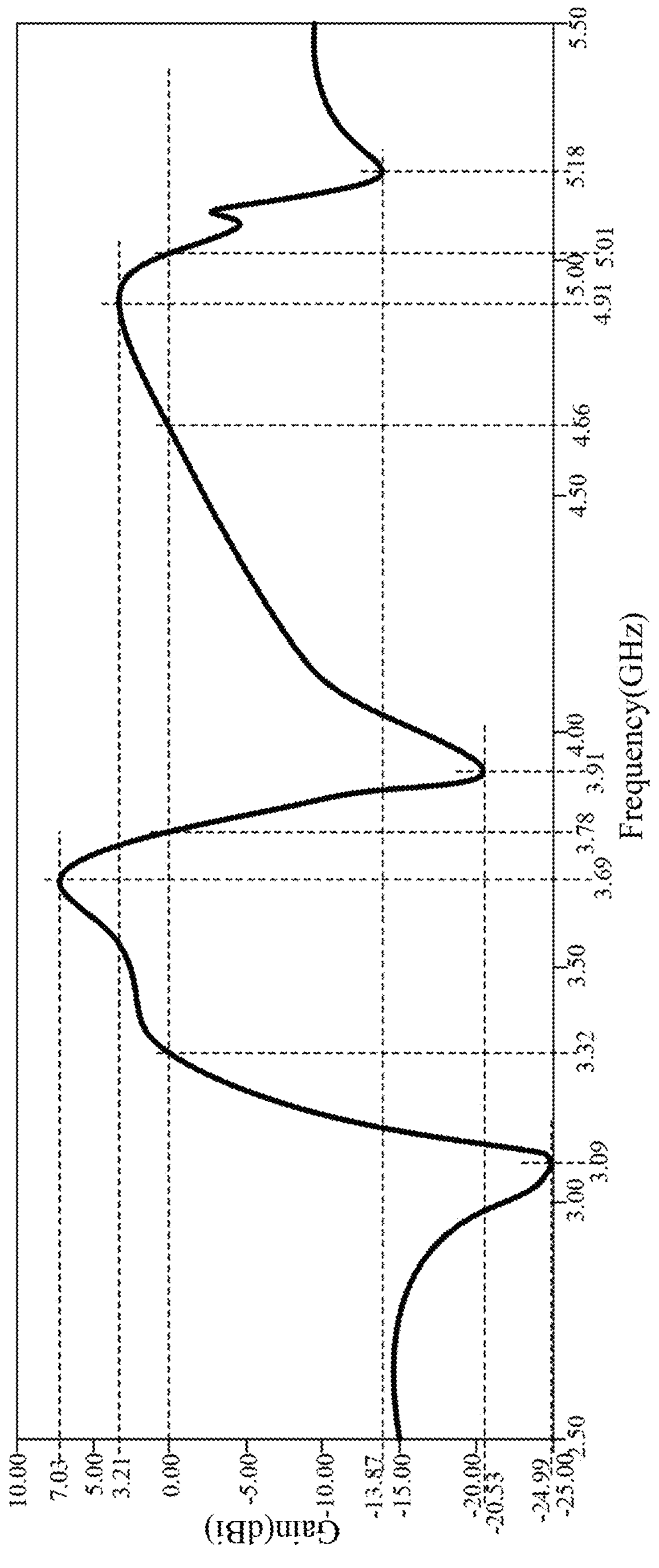
FIG. 12 is a simulation result diagram of a gain curve of the antenna structure as shown in FIG. 11.

FIG. 11 is another schematic plan view of an antenna structure according to at least one embodiment of the present disclosure. FIG. 12 is a simulation result diagram of a gain curve of the antenna structure as shown in FIG. 11.

In some exemplary implementation modes, as shown in FIG. 11, the slotted structure 111 of the radiation patch 11 includes: a first slot 111*a*, a second slot 111*b*, and a third slot 111*c*. The first slot 111*a* and the third slot 111*c* are substantially symmetrically connected on both sides of the second slot 111*b* about the second central axis OO'. The first slot 111*a* is substantially symmetrical about the first central axis QQ'. The third slot 111*c* is substantially symmetrical about the first central axis QQ'. The second slot 111*b* may be located on the first central axis QQ'.

In some exemplary implementation modes, as shown in FIG. 11, the first slot 111*a* has a third portion, a fourth portion, and a fifth portion that are sequentially connected. The third portion and the fifth portion are symmetrically connected on both sides of the fourth portion in the first direction D1. Widths (i.e., lengths along the second direction D2) of the third portion and the fifth portion are substantially the same. For example, the third portion and the fifth portion may be substantially symmetrical about the first central axis OO', and orthographic projections of the third portion and the fifth portion on the substrate 10 may both be L-shaped. The fourth portion communicates with the second slot 111*b*. The fourth portion is substantially symmetrical about the first central axis OO'. A width of the fourth portion gradually decreases along a direction away from a position of communication with the second slot 111*b* until substantially the same as a width of the third portion. In this example, a corner cutting process is performed at a communication position of the first slot 111*a* and the second slot 111*b* so that a width change of the fourth portion of the first slot 111*a* is achieved. For rest of the structure of the antenna structure of the exemplary embodiment, reference may be made to the description of the foregoing embodiments, and thus will not be repeated herein.

In some exemplary implementation modes, the substrate 10 has a planar dimension of about 54.00 mm×50.00 mm. A width a5 (i.e., a length along the second direction D2) of the first portion of the first slot 111*a* of the slotted structure 111 of the radiation patch 11 is about 1.00 mm, a distance d1 between an end portion of the second slot 111*b* and the third portion of the first slot 111*a* is about 1.00 mm, and a distance d2 between a connection position of the fourth portion and the third portion of the first slot 111*a* and a connection position of the fourth portion and the second slot 111*b* is about 7.07 mm. In this example, a width of the fourth portion of the first slot 111*a* may range from about 1.00 mm to 2.00 mm. In some examples, a value of d1 may be about 1 mm to 7 mm, and a distance along the first direction D1 between the third portion of the first slot 111*a* and the second slot 111*b* may be about 1 mm to 7 mm. However, this embodiment is not limited thereto. For remaining parameters of the antenna structure of the embodiment, reference may be made to the description of the embodiment shown in FIG. 1, and thus will not be repeated herein.

In some exemplary implementation modes, a thickness of the antenna structure is about $0.013\lambda_0$. $\lambda_0$ represents a vacuum wavelength. As shown in FIG. 12, a gain bandwidth of the antenna structure at 0 dBi is about 3.32 GHz to 3.78 GHz and 4.66 GHz to 5.01 GHz. A maximum gain in the n78 frequency band is about 7.03 dBi and passband selectivity is about −32 dBi and −28 dBi, and a maximum gain in the n79 frequency band is about 3.21 dBi and passband selectivity is about −24 dBi and −18 dBi.

A gain bandwidth of the antenna structure of the exemplary embodiment may cover ranges of n78 and n79 frequency bands and performance in the n78 frequency band is better than performance in the n79 frequency band. The antenna structure of the exemplary embodiment may meet requirements of the mobile terminal device for antenna performance and thinning.

Compared with the antenna structure shown in FIG. 1 according to the antenna structure of this example, a corner cutting processing is performed on a shape of the slotted structure of the radiation patch. Compared with the simulation result of the antenna structure shown in FIG. 1, the gain curve of the antenna structure of this example are basically consistent with the gain curve of the antenna structure shown in FIG. 1, indicating that the corner cutting processing of the slotted structure does not significantly change performance of the antenna structure. Since a cut corner of the slotted structure in this example is far away from the feed structures and is symmetrically designed about the first central axis, there is no significant effect on a distribution of a current on the radiation patch.

Figure 13:
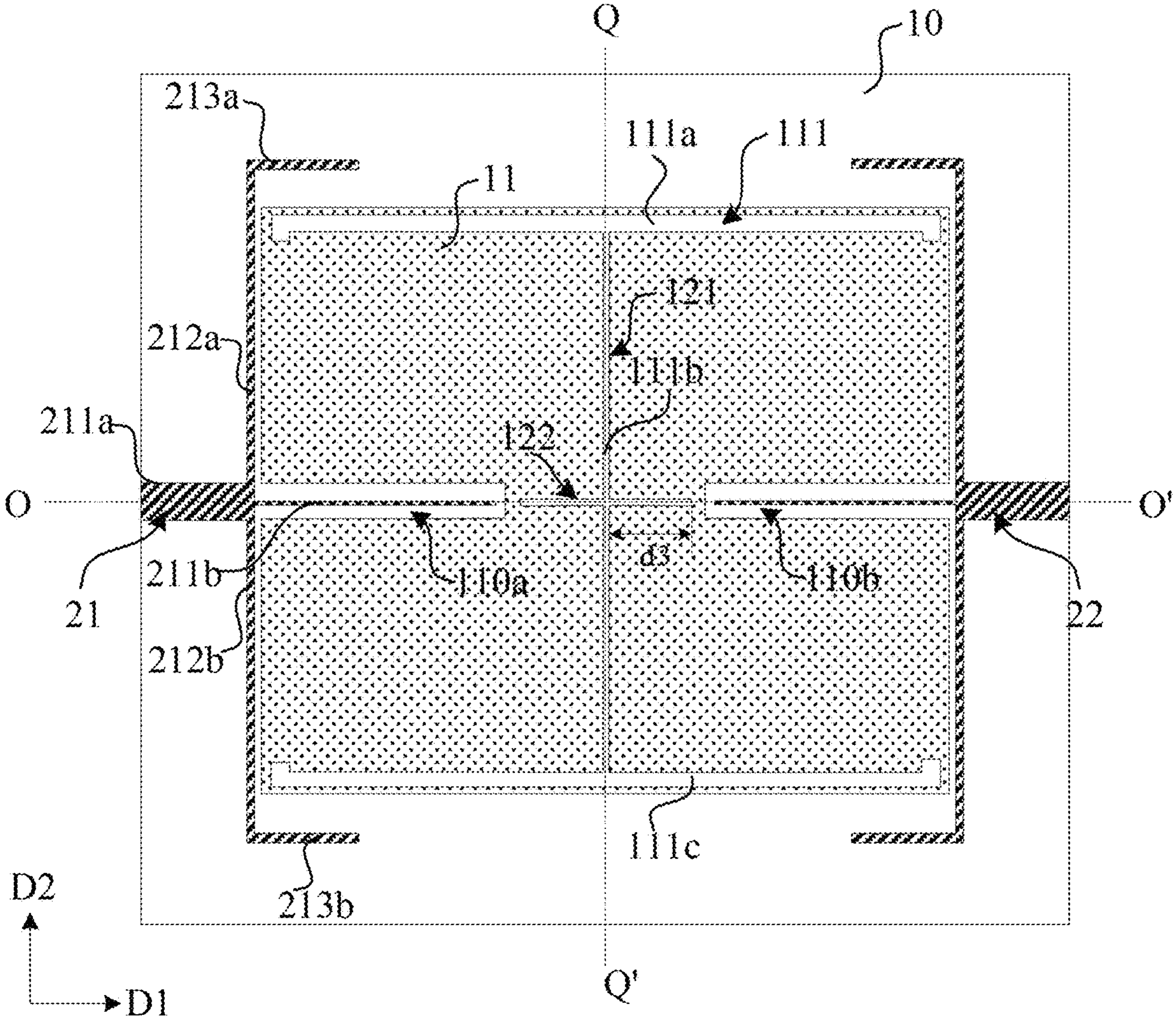
FIG. 13 is another schematic plan view of an antenna structure according to at least one embodiment of the present disclosure.
Figure 14:
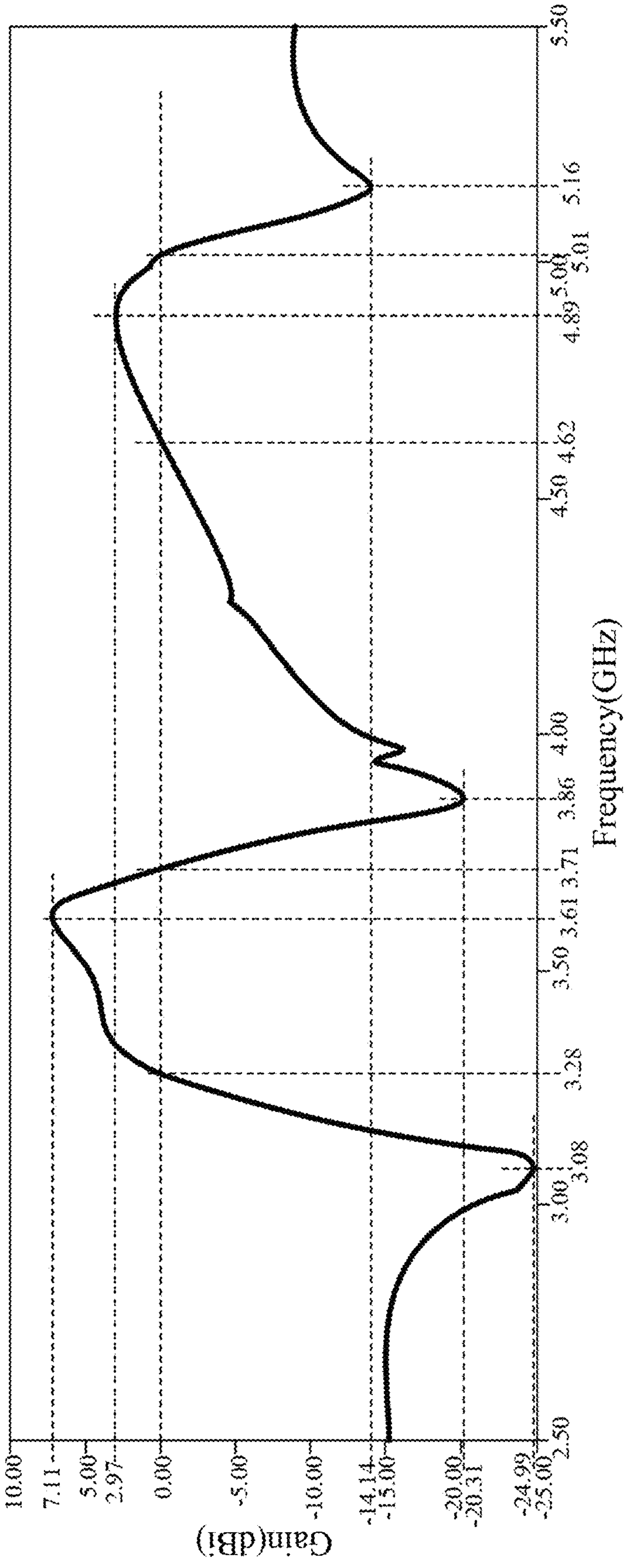
FIG. 14 is a simulation result diagram of a gain curve of the antenna structure as shown in FIG. 13.

FIG. 13 is another schematic plan view of an antenna structure according to at least one embodiment of the present disclosure. FIG. 14 is a simulation result diagram of a gain curve of the antenna structure as shown in FIG. 13.

In some exemplary implementation modes, as shown in FIG. 13, the slotted structure 111 of the radiation patch 11 includes: a first slot 111*a*, a second slot 111*b*, and a third slot 111*c*. The first slot 111*a* and the third slot 111*c* are substantially symmetrically connected at both ends of the second slot 111*b* about the second central axis OO'. The first slot 111*a* is substantially symmetrical about the first central axis QQ'. The third slot 111*c* is substantially symmetrical about the first central axis QQ'. The second slot 111*b* has a first slit 121 extending along the second direction D2 and a second slit 122 extending along the first direction D1. The first slit 121 may be located on the first central axis QQ' and the second slit 122 may be located on the second central axis OO'. The second slit 122 may be located between the first notch 110*a* and the second notch 110*b* of the radiation patch 11 in the first direction D1.

In some exemplary implementation modes, a width of the first slit 121 (i.e. a length along the first direction D1) and a width of the second slit 122 (i.e. a length along the second direction D2) may be substantially the same. A length of the first slit 121 along the second direction D2 may be greater than a length of the second slit 122 along the first direction D1.

The rest of structures of the antenna structure of this exemplary embodiment may refer to the description of the foregoing embodiments, which will not be repeated herein.

In some exemplary implementation modes, the substrate 10 has a planar dimension of about 54.00 mm×50.00 mm. The width of the first slit 121 may be about 0.30 mm and the width of the second slit 122 may be about 0.30 mm. A distance D3 between an end of the second slit 122 and the first slit 121 in the first direction D1 may be about 4.85 mm. In some examples, the width of the second slot 122 may range from about 0.3 mm to 2.3 mm and a value of D3 may range from about 2.5 mm to 5.5 mm. However, this embodiment is not limited thereto. For remaining parameters of the antenna structure of the embodiment, reference may be made to the description of the embodiment shown in FIG. 1, and thus will not be repeated herein.

In some exemplary implementation modes, a thickness of the antenna structure is about $0.013\lambda_0$. $\lambda_0$ represents a vacuum wavelength. As shown in FIG. 14, a gain bandwidth of the antenna structure at 0 dBi is about 3.28 GHz to 3.71 GHz and 4.62 GHz to 5.01 GHz. A maximum gain in an n78 frequency band is about 7.11 dBi and passband selectivity is about −32 dBi and −27 dBi, respectively, and a maximum gain in an n79 frequency band is about 2.97 dBi and passband selectivity is about −23 dBi and −17 dBi.

A gain bandwidth of the antenna structure of the exemplary embodiment may cover ranges of n78 and n79 frequency bands and performance in the n78 frequency band is better than performance in the n79 frequency band. The antenna structure of the exemplary embodiment may meet requirements of the mobile terminal device for antenna performance and thinning.

Compared with the antenna structure shown in FIG. 1 according to the antenna structure of this example, a shape of the slotted structure of the radiation patch is adjusted and a slit is introduced. Compared with the simulation result of the antenna structure shown in FIG. 1, the gain curve of the antenna structure of this example are basically consistent with the gain curve of the antenna structure shown in FIG. 1, indicating that this additional introduced slit does not significantly change performance of the antenna structure. Since the slit introduced in the slotted structure in this example is remote from the feed structures and is symmetrically designed about both the first central axis and the second central axis, there is no significant effect on a distribution of a current on the radiation patch.

Figure 15:
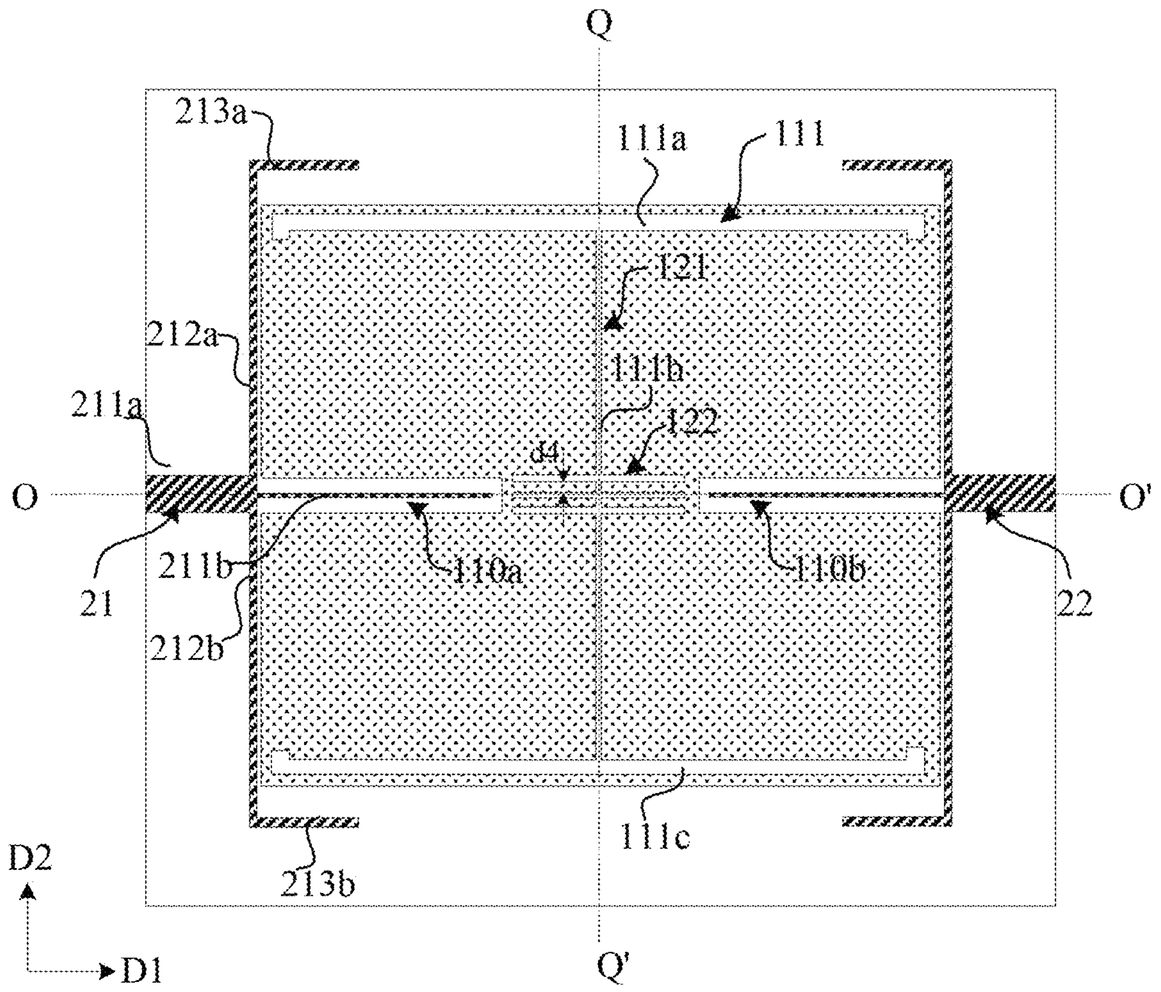
FIG. 15 is another schematic plan view of an antenna structure according to at least one embodiment of the present disclosure.
Figure 16:
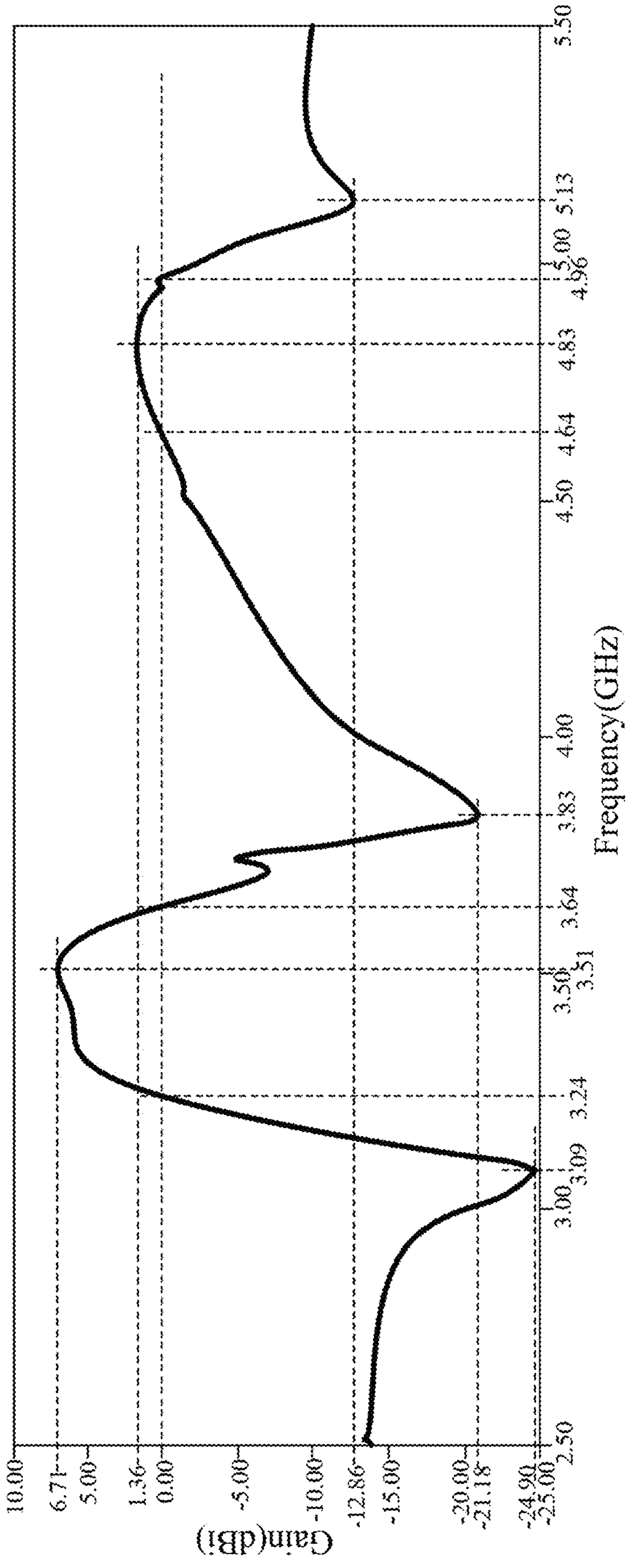
FIG. 16 is a simulation result diagram of a gain curve of the antenna structure as shown in FIG. 15.

FIG. 15 is another schematic plan view of an antenna structure according to at least one embodiment of the present disclosure. FIG. 16 is a simulation result diagram of a gain curve of the antenna structure as shown in FIG. 15.

In some exemplary implementation modes, as shown in FIG. 15, the slotted structure 111 of the radiation patch 11 includes: a first slot 111*a*, a second slot 111*b*, and a third slot 111*c*. The first slot 111*a* and the third slot 111*c* are substantially symmetrically connected at both ends of the second slot 111*b* about the second central axis OO'. The first slot 111*a* is substantially symmetrical about the first central axis QQ'. The third slot 111*c* is substantially symmetrical about the first central axis QQ'. The second slot 111*b* has a first slit 121 extending along the second direction D2 and three second slits 122 extending along the first direction D1. The three second slits 122 are arranged sequentially along the second direction D2. The first slit 121 may be located on the first central axis QQ' and a middle second slot 122 may be located on the second central axis OO'. The three second slits 122 are located between the first notch 110*a* and the second notch 110*b* of the radiation patch 11 in the first direction D1.

For rest of the structure of the antenna structure of the exemplary embodiment, reference may be made to the description of the foregoing embodiments, and thus will not be repeated herein.

In some exemplary implementation modes, the substrate 10 has a planar dimension of about 54.00 mm×50.00 mm. In the second direction D2, a pitch d4 between adjacent second slits 122 may be about 0.70 mm. In some examples, a value of d4 may range from about 0.5 mm to 1.5 mm. However, this embodiment is not limited thereto. For remaining parameters of the antenna structure of the embodiment, reference may be made to the description of the embodiment shown in FIG. 1, and thus will not be repeated herein.

In some exemplary implementation modes, a thickness of the antenna structure is about $0.013\lambda_0$. $\lambda_0$ represents a vacuum wavelength. As shown in FIG. 16, a gain bandwidth of the antenna structure at 0 dBi is about 3.24 GHz to 3.64 GHz and 4.64 GHz to 4.96 GHz. A maximum gain in the n78 frequency band is about 6.71 dBi and passband selectivity is about −32 dBi and −28 dBi, and a maximum gain in the n79 frequency band is about 1.36 dBi and passband selectivity is about −22 dBi and −14 dBi.

A gain bandwidth of the antenna structure of the exemplary embodiment may cover ranges of n78 and n79 frequency bands and performance in the n78 frequency band is better than performance in the n79 frequency band. The antenna structure of the exemplary embodiment may meet requirements of the mobile terminal device for antenna performance and thinning.

Compared with the antenna structure shown in FIG. 1 according to the antenna structure of this example, a shape of the slotted structure of the radiation patch is adjusted and three slits are introduced. Compared with the simulation result of the antenna structure shown in FIG. 1, the gain curve of the antenna structure of this example is deteriorated significantly, indicating that these three additional introduced slits significantly change performance of the antenna structure. The three slits additionally introduced in this example are designed symmetrically about the first central axis and the second central axis, and a pitch between adjacent slits in the second direction is about 0.5 mm to 1.5 mm, which will not significantly affect performance of the antenna structure. However, the three slits additionally introduced in this example change a distribution of a current over the entire radiation patch and therefore performance is deteriorated compared to the antenna structure shown in FIG. 1.

According to the antenna structure provided by the exemplary embodiment, a differentially fed dual-frequency filtering antenna structure may be achieved by providing the slotted structure on the radiation patch and providing the first feed structure and the second feed structure symmetrical along the first central axis. According to this implementation mode, a surface current distribution of the radiation patch and the feed structures is changed through a planar structure design, so as to achieve a filtering function. The antenna structure provided by this embodiment may be applied to the frequency bands of n78 and n79 of 5G.

Figure 17:
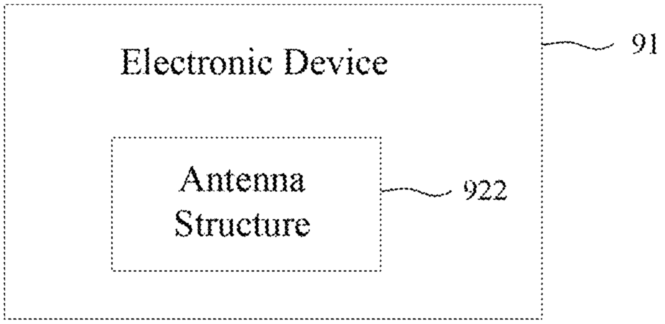
FIG. 17 is a schematic diagram of an electronic device according to at least one embodiment of the present disclosure.

FIG. 17 is a schematic diagram of an electronic device according to at least one embodiment of the present disclosure. As shown in FIG. 17, this embodiment provides an electronic device 91, including an antenna structure 922. The electronic device 91 may be: any product or component with a communication function, such as a mobile phone, a navigation apparatus, a game machine, a television (TV), a car audio system, a tablet computer, a Personal Media Player (PMP), and a Personal Digital Assistant (PDA). However, this embodiment is not limited thereto.

Figure 18:
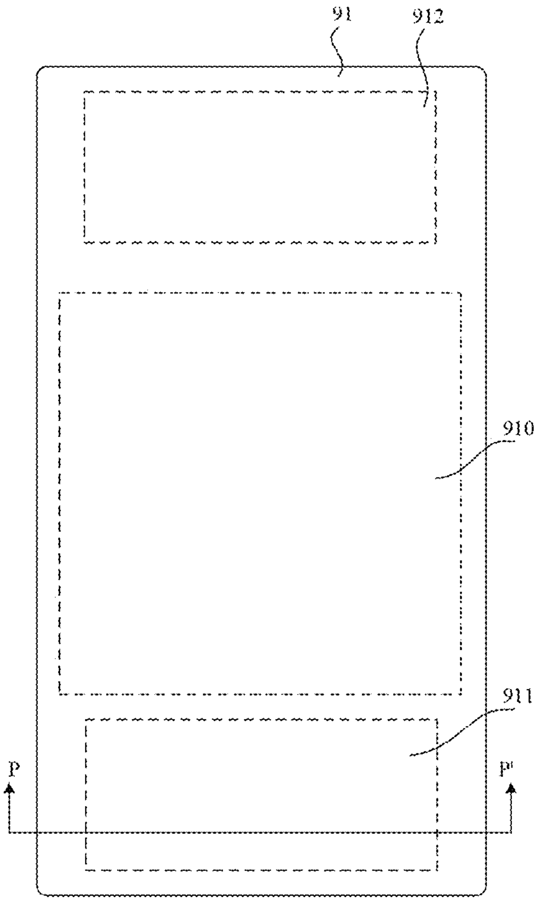
FIG. 18 is a schematic plan view of an electronic device according to at least one embodiment of the present disclosure.
Figure 19:
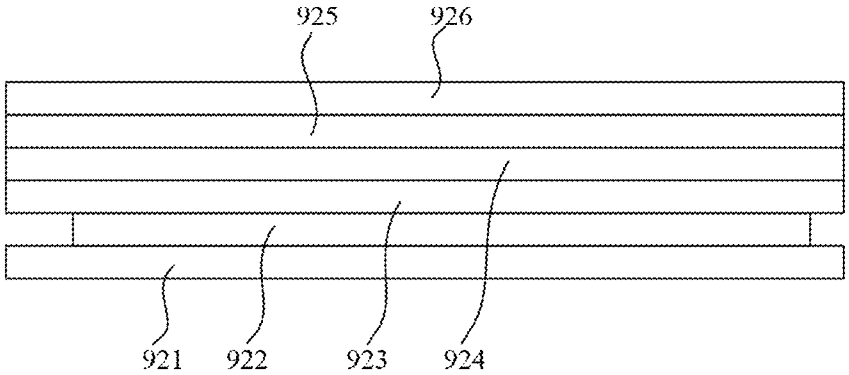
FIG. 19 is a partial cross-sectional schematic diagram along a P-P' direction in FIG. 18.

FIG. 18 is a schematic plan view of an electronic device according to at least one embodiment of the present disclosure. FIG. 19 is a partial cross-sectional schematic diagram along a P-P' direction in FIG. 18. In some exemplary implementation modes, the electronic device 91 being a display device is taken as an example. As shown in FIG. 18, in a plane parallel to the electronic device, the electronic device 91 includes: a battery region 910, and a first region 911 and a second region 912 located on two sides of the battery region 910. In some examples, a battery is arranged in the battery region 910. The antenna structure 922 may be arranged on at least one of the first region 911 and the second region 912. However, this embodiment is not limited thereto. In some examples, the antenna structure may be arranged in a region between the first region 911 and a frame of the electronic device 91, or arranged in a region between the second region 912 and the frame of the electronic device 91.

In some exemplary implementation modes, the antenna structure 922 being arranged in the first region 911 is taken as an example. As shown in FIG. 19, in a plane perpendicular to the electronic device, the electronic device 91 includes: a rear cover 921, an antenna structure 922, a housing 923, a printed circuit board 924, a display screen 925, and a glass cover plate 926. The glass cover plate 926 is in tight fit with the display screen 925, which may achieve a dust-proof effect on the display screen 925. The housing 923 mainly serves a function of supporting the whole device. The antenna structure 922 may be arranged on the rear cover 921, and is connected with the printed circuit board 924 through an opening in the housing 923. However, this embodiment is not limited thereto.

The drawings of the present disclosure only involve the structures involved in the present disclosure, and other structures may refer to conventional designs. The embodiments of the present disclosure and features in the embodiments may be combined mutually to obtain new embodiments if there is no conflict.

Those of ordinary skills in the art should understand that modifications or equivalent replacements may be made to the technical solutions of the present disclosure without departing from the spirit and scope of the technical solutions of the present disclosure, and shall all fall within the scope of the claims of the present disclosure.

The invention claimed is:

1. An antenna structure, comprising: a substrate, a ground layer, a radiation patch, a first feed structure, and a second feed structure; wherein;

the radiation patch, the first feed structure, and the second feed structure are located on a first surface of the substrate, and the ground layer is located on a second surface of the substrate;

the first surface and the second surface are two surfaces of the substrate facing away from each other;

the radiation patch has a slotted structure;

in a first direction, the first feed structure and the second feed structure are symmetrically located on both sides of the radiation patch, the slotted structure has a first slot, a second slot, and a third slot;

the first slot and the third slot are connected on both sides of the second slot symmetrically about a second centerline of the radiation patch in a second direction, and the second slot communicates with the first slot and the third slot;

the second slot comprises a first slit extending along the second direction and three second slits extending along the first direction; the three second slits are arranged sequentially along the second direction; the first slit is located on a first centerline of the radiation patch in the first direction and a middle second slit of the three second slits is located on the second centerline;

the radiation patch comprises a first notch at a first edge and a second notch at a second edge in a plane parallel to the substrate; and the three second slits are located between the first notch and the second notch of the radiation patch in the first direction.

2. The antenna structure according to claim 1, wherein the radiation patch is configured to introduce two resonant frequency points and one radiation zero point between the two resonant frequency points, and the first feed structure and the second feed structure are configured to introduce another two radiation zero points.

3. The antenna structure according to claim 1, wherein the slotted structure is substantially symmetrical about the first centerline of the radiation patch in the first direction and is substantially symmetrical about the second centerline of the radiation patch in the second direction; and the second direction intersects the first direction.

4. The antenna structure according to claim 3, wherein an orthographic projection of the slotted structure on the substrate is substantially H-shaped.

5. The antenna structure according to claim 1, wherein a width of the first slot is less than a width of the second slot.

6. The antenna structure according to claim 1, wherein orthographic projections of the first slot and the third slot on the substrate are straight line segments parallel to the second direction.

7. The antenna structure according to claim 1, wherein the first slot has a first portion and a second portion in communication;

orthographic projections of the first portion and the second portion on the substrate are both L-shaped, and the first portion and the second portion are substantially symmetrical about the first centerline.

8. The antenna structure according to claim 1, wherein the first slot has a third portion, a fourth portion, and a fifth portion in communication;

the third portion and the fifth portion are symmetrically connected on both sides of the fourth portion in the first direction; and the fourth portion communicates with the second slot, and a width of the fourth portion gradually decreases along a direction away from a position of communication with the second slot until substantially the same as a width of the third portion.

9. The antenna structure according to claim 1, wherein an orthographic projection of the second slot on the substrate is a straight line segment parallel to the first direction.

10. The antenna structure according to claim 1, wherein any second slit is substantially symmetrical about the first centerline and the n-three second slits are substantially symmetrical about the second centerline.

11. The antenna structure according to claim 1, wherein the radiation patch has the first edge and the second edge in the first direction in a plane parallel to the substrate;

the first feed structure is adjacent to the first edge, and the second feed structure is adjacent to the second edge; and a pitch between the first feed structure and the first edge of the radiation patch is less than or equal to a pitch between the second feed structure and the second edge of the radiation patch.

12. The antenna structure according to claim 11, wherein at least a portion of the first feed structure is located within the first notch, and at least a portion of the second feed structure is located within the second notch.

13. The antenna structure according to claim 12, wherein the first feed structure comprises: a feed main body, a first branch, and a second branch; and the first branch and the second branch are electrically connected on both sides of the feed main body symmetrically about a centerline of the first feed structure in the second direction.

14. The antenna structure according to claim 13, wherein the feed main body comprises: a first feed main body and a second feed main body electrically connected in sequence;

the first branch and the second branch are electrically connected on both sides of the first feed main body symmetrically about the centerline of the first feed structure in the second direction; and a width of the first feed main body is greater than a width of the second feed main body, and at least a portion of the second feed main body is located within the first notch of the radiation patch.

15. The antenna structure according to claim 14, wherein the first branch comprises: a first feed branch and a first open-circuit branch, wherein the first feed branch is electrically connected with the first feed main body and the first open-circuit branch, and the first open-circuit branch is located on one side of the first feed branch away from the first feed main body; and the second branch comprises: a second feed branch and a second open-circuit branch, the second feed branch is electrically connected with the first feed main body and the second open-circuit branch, and the second open-circuit branch is located on one side of the second feed branch away from the first feed main body.

16. The antenna structure according to claim 15, wherein the first open-circuit branch and the second open-circuit branch are straight line segments parallel to the first direction.

17. The antenna structure according to claim 1, wherein orthographic projections of the radiation patch, the first feed structure, and the second feed structure on the substrate are not overlapped.

18. An electronic device, comprising the antenna structure according to claim 1.

* * * * *